(12) United States Patent
Adaniya et al.

(10) Patent No.: US 7,667,363 B2
(45) Date of Patent: Feb. 23, 2010

(54) PERMANENT MAGNET EMBEDMENT ROTATING ELECTRIC MACHINE, MOTOR FOR CAR AIR CONDITIONER, AND ENCLOSED ELECTRIC COMPRESSOR

(75) Inventors: Taku Adaniya, Kariya (JP); Tatsuya Horiba, Kariya (JP); Taizo Hirano, Kariya (JP); Kensuke Ikai, Kariya (JP); Minoru Mera, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 304 days.

(21) Appl. No.: 11/738,318

(22) Filed: Apr. 20, 2007

(65) Prior Publication Data

US 2007/0257576 A1    Nov. 8, 2007

(30) Foreign Application Priority Data

Apr. 20, 2006  (JP)  .............................. 2006-117269
Dec. 19, 2006  (JP)  .............................. 2006-341466

(51) Int. Cl.
    H02K 1/27      (2006.01)
    H02K 21/14     (2006.01)
(52) U.S. Cl. .............................. 310/156.53; 310/156.56; 310/156.57; 310/216.069; 310/216.094; 310/216.111
(58) Field of Classification Search ............ 310/156.08, 310/156.38, 156.46, 156.53, 156.56, 156.57, 310/216, 216.069, 216.094, 216.111
    See application file for complete search history.

(56) References Cited

U.S. PATENT DOCUMENTS

| 6,486,581 | B2 * | 11/2002 | Miyashita et al. | ....... 310/156.53 |
| 6,597,079 | B2 * | 7/2003 | Miyashita et al. | ....... 310/156.48 |
| 6,919,663 | B2 * | 7/2005 | Iles-Klumpner | ....... 310/156.53 |
| 2005/0200223 | A1 * | 9/2005 | Tajima et al. | .......... 310/156.46 |
| 2006/0028082 | A1 * | 2/2006 | Asagara et al. | .......... 310/156.53 |
| 2006/0250041 | A1 * | 11/2006 | Adaniya et al. | ........ 310/156.53 |
| 2007/0200447 | A1 * | 8/2007 | Adaniya et al. | ........ 310/156.53 |
| 2007/0257576 | A1 * | 11/2007 | Adaniya et al. | ........ 310/156.53 |

FOREIGN PATENT DOCUMENTS

| JP | 10-285581 | 10/1998 |
| JP | 10-285845 | 10/1998 |
| JP | 11-046464 | 2/1999 |
| JP | 11-178255 | 7/1999 |
| JP | 11-252840 | 9/1999 |
| JP | 2001-069701 | 3/2001 |
| JP | 2002-095194 | 3/2002 |
| JP | 2002-136011 | 5/2002 |

* cited by examiner

*Primary Examiner*—Tran N Nguyen
(74) *Attorney, Agent, or Firm*—Woodcock Washburn LLP

(57) ABSTRACT

Outer circumference of a rotor is alternately provided with a plurality of circumferential portions and a plurality of convex portions. Straight lines each connecting a rotational axis to one of circumferential centers of circumferential portions are referred to as radial lines. Straight lines each bisecting one of convex portions are referred to as bisectors. A plurality of magnetic flux blocking regions are located on a rotor. One of the magnetic flux blocking region is located in a range between the radial line and the bisector adjacent to and preceding the radial line in the rotation direction. Therefore, a permanent magnet embedment rotating electric machine is capable of preventing decreases in torque and suppressing torque ripple.

17 Claims, 20 Drawing Sheets

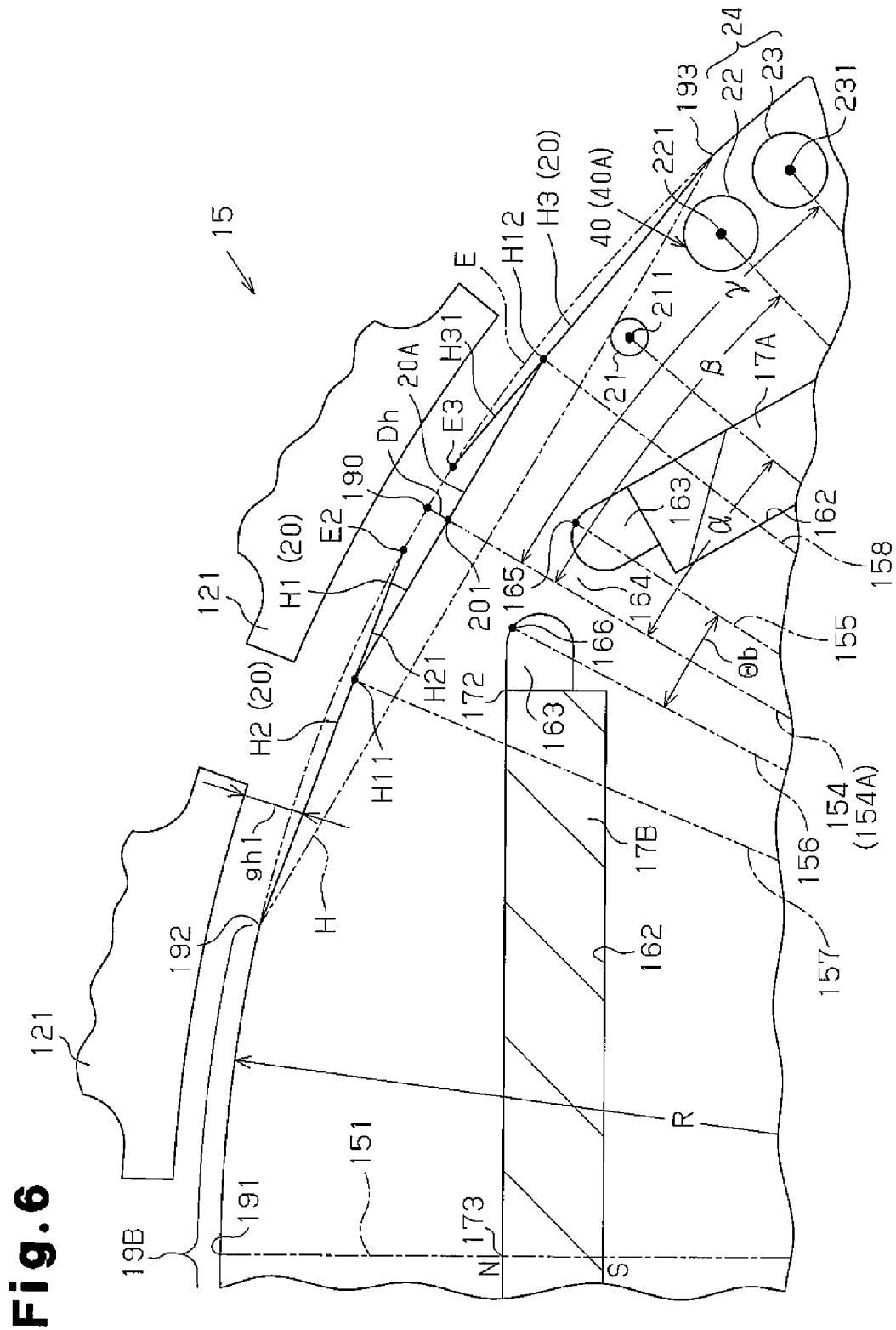

PERMANENT MAGNET EMBEDMENT ROTATING ELECTRIC MACHINE, MOTOR FOR CAR AIR CONDITIONER, AND ENCLOSED ELECTRIC COMPRESSOR

CROSS REFERENCE TO RELATED APPLICATIONS

This application claims priority to Japanese Patent Application Nos. 2006-117269 filed Apr. 20, 2006 and 2006-341466 filed Dec. 19, 2006.

BACKGROUND OF THE INVENTION

The present invention relates to a permanent magnet embedment rotating electric machine, a motor for car air conditioner, and an enclosed electric compressor. The rotating electric machine includes a stator having coils and a rotor rotatably arranged in the stator. Permanent magnets are embedded as magnetic poles inside the rotor.

Permanent magnets are embedded inside the rotor of this type of rotating electric machine so as to be adjacent to each other in the circumferential direction of the rotor. A pair of the permanent magnets adjacent to each other in the circumferential direction of the rotor are arranged so as to have different polarities. Sudden magnetic flux density fluctuation occurs at a location between the two adjacent permanent magnets, that is, a magnetic pole switching part. Thus, torque pulsation occurs, which causes vibration and noise in the rotating electric machine. Hereinafter, the torque pulsation is referred to as torque ripple. The torque ripple represents fluctuation range of output torque of the rotating electric machine.

Japanese Laid-Open Patent Publication No. 2001-69701 discloses a motor that suppresses torque pulsation. The radius of a rotor is minimal at magnetic pole switching parts, and is maximum at central portions of permanent magnets, that is, magnetic pole centers. The rotor has an outer circumference having a sinusoidal waveform.

Japanese Laid-Open Patent Publication No. 2002-95194 discloses a motor having a rotor, parts of the outer circumference of which correspond to magnetic pole centers project outward into the shape of an arc.

Japanese Laid-Open Patent Publication No. 2002-136011 discloses a motor having a rotor, parts of the outer circumference of which correspond to magnetic pole centers form circumferential portions coaxial with the rotational center of the rotor. Parts of the outer circumference of the rotor in the vicinity of the ends of the adjacent magnetic poles of two permanent magnets are grooved.

In Japanese Laid-Open Patent Publication No. 10-285851, an iron core of the rotor has magnet insertion holes, which accommodate permanent magnets. The iron core has slits formed at portions outward of the magnet insertion holes.

However, in the motors of the above publications No. 2001-69701 and No. 2002-95194, the gap between teeth of a stator and the outer circumference of the rotor becomes minimal only at points. These points are portions corresponding to the magnetic pole centers in the side cross-section of the outer circumference of the rotor. Thus, a torque constant of the motor, that is, possible output torque per unit current is small compared to a case, for example, where the radius of the outer circumference of the rotor is constant through the entire circumference.

In the motor of the above publication No. 2002-136011, the gap between the teeth of the stator and the outer circumference of the rotor varies greatly between the circumferential portion and the grooved portions. Therefore, the torque pulsation is not easily suppressed. When the grooves are deep, the torque constant of the motor disclosed in the above publication No. 2002-136011 is smaller than the torque constant of the motor disclosed in the publications No. 2001-69701 and No. 2002-95194.

The publication No. 10-285851 describes that the slits prevent magnetic saturation of the teeth that face parts of the iron core toward the rotation direction of the rotor. However, the publication No. 10-285851 does not describe the relationship between the existence of the slits and suppression of the torque ripple.

SUMMARY OF THE INVENTION

Accordingly, it is an objective of the present invention to provide a permanent magnet embedment rotating electric machine capable of preventing decreases in torque and suppressing torque ripple. Furthermore, it is an objective of the present invention to provide a motor for car air conditioner equipped with the rotating electric machine and an enclosed electric compressor equipped with the motor.

According to one aspect of the invention, a permanent magnet embedment rotating electric machine is provided. The rotating electric machine includes an annular stator defining a radial direction; and a plurality of teeth arranged on an inner circumference of the stator. A slot is defined between each adjacent pair of the teeth. Each of a plurality of coils is arranged in the corresponding slots. A rotor is located inside of the stator. The rotor is rotatable in a rotation direction. The rotor defines a rotational axis, a virtual circumference about the rotational axis, and an outer circumference. The outer circumference is alternately provided with a plurality of circumferential portions and a plurality of convex portions. The circumferential portions are included in the virtual circumference. Each of the circumferential portions includes a circumferential center. The convex portions are located radially inward of the virtual circumference and bulging radially outward. Each convex portion includes first and second angle portions. Three straight lines are connected to one another to define the first and second angle portions. Straight lines each connecting the rotational axis to one of the circumferential centers are referred to as radial lines. Straight lines each bisecting one of the convex portions are referred to as bisectors. A plurality of permanent magnets are embedded inside the rotor. Each of the permanent magnets has a magnetic pole center. A plurality of magnetic flux blocking regions are located on the rotor. One of the magnetic flux blocking region is located in a range between the radial line and the bisector adjacent to and preceding the radial line in the rotation direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is an enlarged cross-sectional view of FIG. 5;

DETAILED DESCRIPTION OF THE PREFERRED EMBODIMENTS

A first embodiment of the present invention will now be described with reference to FIGS. 1A to 18.

Figure 1:
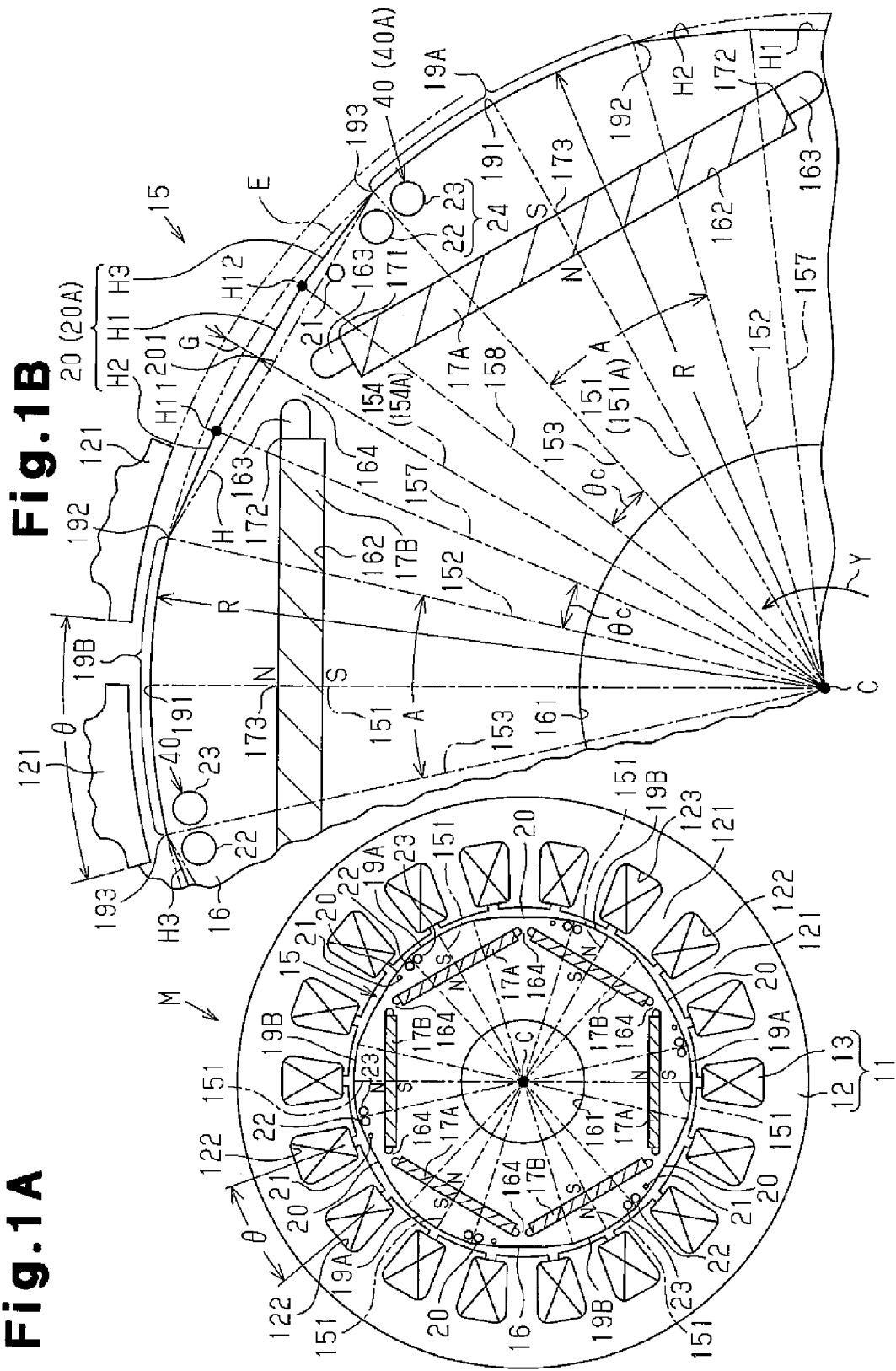
FIG. 1A is a front cross-sectional view illustrating a stator and a rotor of a motor according to a first embodiment of the present invention.
FIG. 1B is a partially enlarged cross-sectional view of FIG. 1A.
Figure 2:
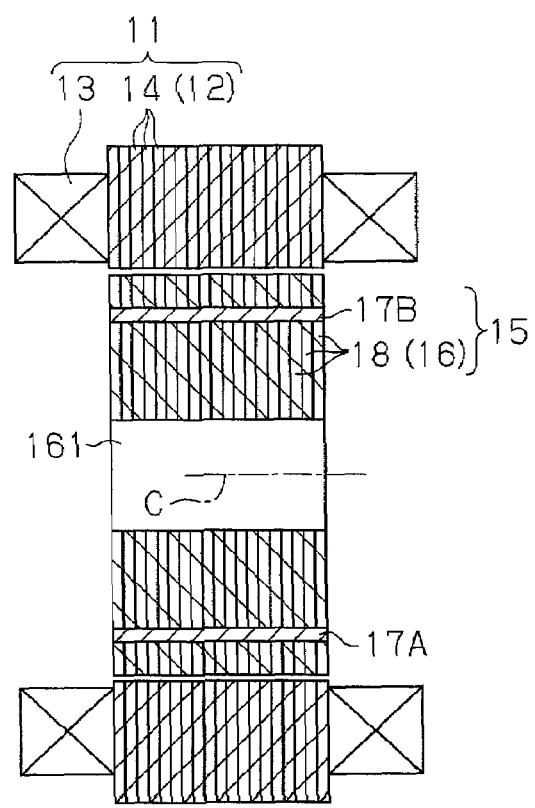
FIG. 2 is a side cross-sectional view illustrating the stator and the rotor of FIG. 1A.

As shown in FIG. 1A, a rotating electric machine M includes an annular stator 11 and a rotor 15, which is located inward of the stator 11. The stator 11 includes an annular stator core 12, teeth 121, which are arranged at the inner circumference of the stator core 12, and a coil 13, which is provided in slots 122 between the teeth 121. In the first embodiment, the number of the teeth 121 and the number of the slots 122 are eighteen each. The slots 122 are arranged at equal pitch in the circumferential direction of the stator 11. As shown in FIG. 2, the stator core 12 is configured by laminating core plates 14, which are magnetic bodies (steel plates). The coils 13 are wound into wave winding.

Generally, the following relational expression is satisfied when expressing the number of poles as p (integer), the number of phases as m (integer), the number of slots per phase for each pole as q, and the number of slots of the stator as K. The number of slots q has values every 0.5, such as q=0.5, 1.0, 1.5, 2.0, 2.5, . . . .

$$K = q \times p \times m$$

For instance, in a case in which there are three phases and q=1, the relationship between the number of slots K and the number of poles p is four poles and twelve slots, six poles and eighteen slots, eight poles and twenty-four slots, and so on. In a case in which there are three phases and q=1.5, the number of slots K and the number of poles p is four poles and eighteen slots, six poles and twenty-seven slots, eight poles and thirty-six slots, and so on.

Figure 3:
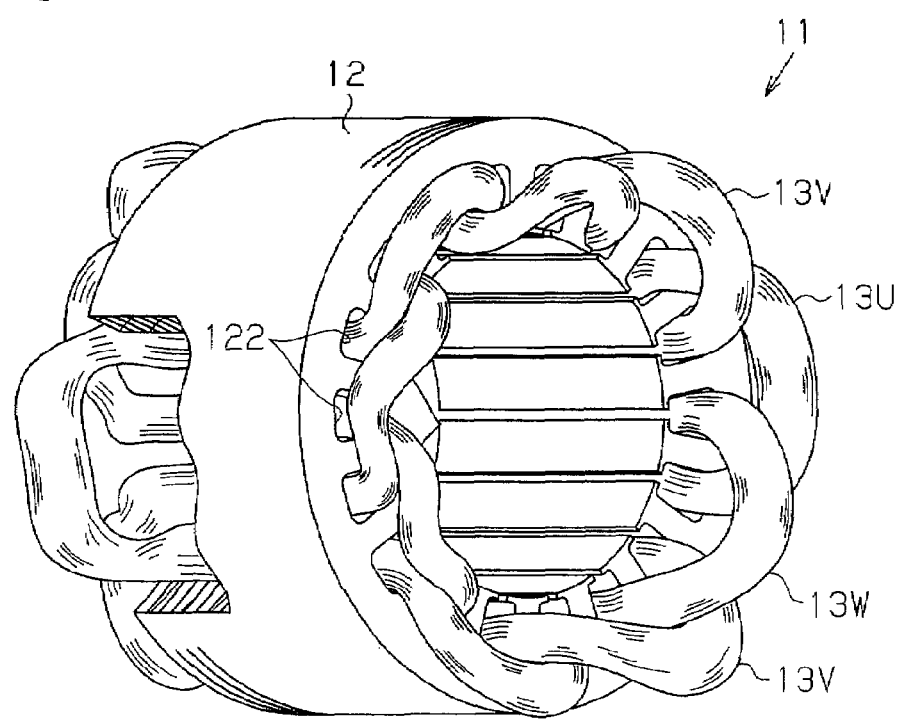
FIG. 3 is a perspective view illustrating the stator of FIG. 1A.
Figure 4:
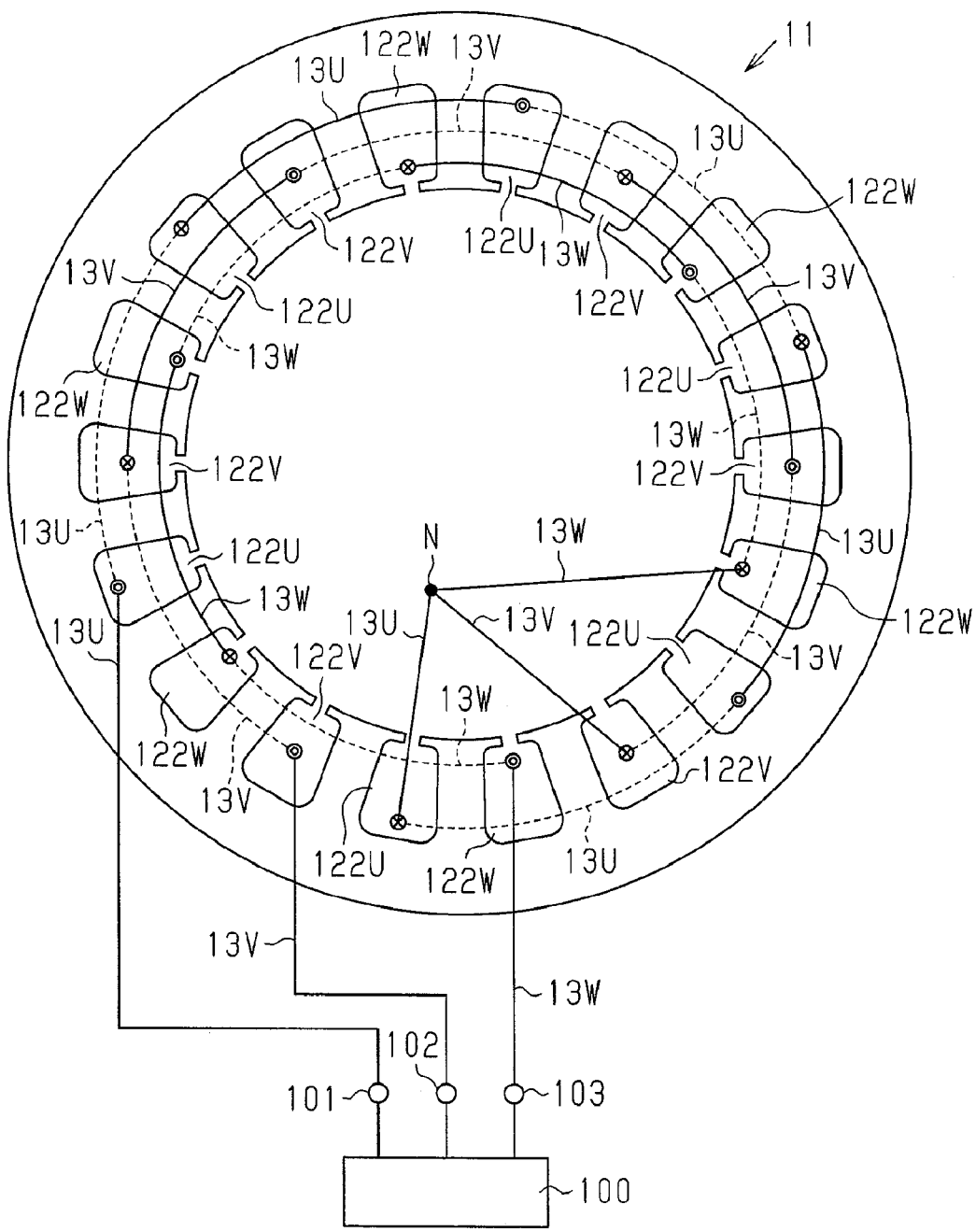
FIG. 4 is a simplified view for explaining wave winding of the coil of the stator of FIG. 1A.

FIGS. 3 and 4 show a case where the coil 13 is wound into a wave winding for six poles and eighteen slots. As shown in FIG. 4, an inverter 100 includes a U-phase terminal 101 to which a U-phase coil 13U is connected, a V-phase terminal 102 to which a V-phase coil 13V is connected, and a W-phase terminal 103 to which a W-phase coil 13W is connected. The U-phase coil 13U extends through a group of first slots 122U. The V-phase coil 13V extends through a group of second slots 122V. The W-phase coil 13W extends through a group of third slots 122W. The portions of the coils 13U, 13V, 13W shown by solid lines are arranged on the front end face of the stator 11 that can be seen in this drawing. The portions of the coils 13U, 13V, 13W shown by broken lines are arranged on the opposite end face of the stator 11 that cannot be seen in this drawing. The joined parts of the solid line portion and the broken line portion of the coils 13U, 13V, 13W extend through the slots 122U, 122V, 122W. A neutral point N connects the terminating ends of each coil 13U, 13V, 13W.

As shown in FIG. 1A, the rotor 15 includes a rotor core 16, first permanent magnets 17A and second permanent magnets 17B, which are embedded in the rotor core 16. In the first embodiment, the number of the first permanent magnets 17A is three, and the number of the second permanent magnets 17B is also three. The first permanent magnets 17A and the second permanent magnets 17B are alternately arranged in the circumferential direction of the rotor 15. The permanent magnets 17A, 17B all have the same flat shape and the same size. The eighteen slots 122 are arranged at an equal pitch in the circumferential direction of the stator 11. The angular width 0 of the pitch of the slots 122 is 20°. The angular width has its center at the rotational axis C of the rotor 15.

As shown in FIG. 2, the rotor core 16 is configured by laminating core plates 18, which are magnetic bodies (steel plates). A shaft hole 161 extends through the center of the rotor core 16. An output shaft (a rotating shaft 32 shown in FIG. 29) extends through and fixed to the shaft hole 161.

As shown in FIG. 1B, the rotor 15 includes six accommodating holes 162, in which the three first permanent magnets 17A and the three second permanent magnets 17B are fitted. The accommodating holes 162 extend through the rotor core 16 parallel to the shaft hole 161. The magnetic pole of each first permanent magnet 17A differs from the second permanent magnet 17B that is adjacent in the circumferential direction of the rotor 15. That is, the first permanent magnets 17A and the second permanent magnets 17B are embedded in the rotor 15 so as to alternately have different polarities in the circumferential direction.

Each of the first and second permanent magnets 17A, 17B includes a first magnetic pole end 171 and a second magnetic pole end 172 on the opposite end. A magnetic pole center 173 is located midway between each first magnetic pole end 171 and the associated second magnetic pole end 172. The rotor 15 defines six radial lines 151, each of which extends through one of the magnetic pole centers 173. Each radial line 151 is orthogonal to the corresponding first permanent magnet 17A or the second permanent magnet 17B. The radial lines 151 extend from the rotational axis C. The six radial lines 151 are spaced at equal angular intervals (60°) about the rotational axis C. The first permanent magnets 17A and the second permanent magnets 17B are spaced from the rotational axis C by an equal distance. The first permanent magnets 17A and the second permanent magnets 17B are arranged at an equal pitch in the circumferential direction of the rotor 15.

A pair of openings 163 are provided on the ends of each accommodating hole 162. That is, the openings 163 are defined in the vicinity of the magnetic pole ends 171, 172 in a state where the permanent magnets 17A, 17B are accommodated in the accommodating holes 162. The openings 163 prevent a short circuit of a magnetic path.

Figure 5:
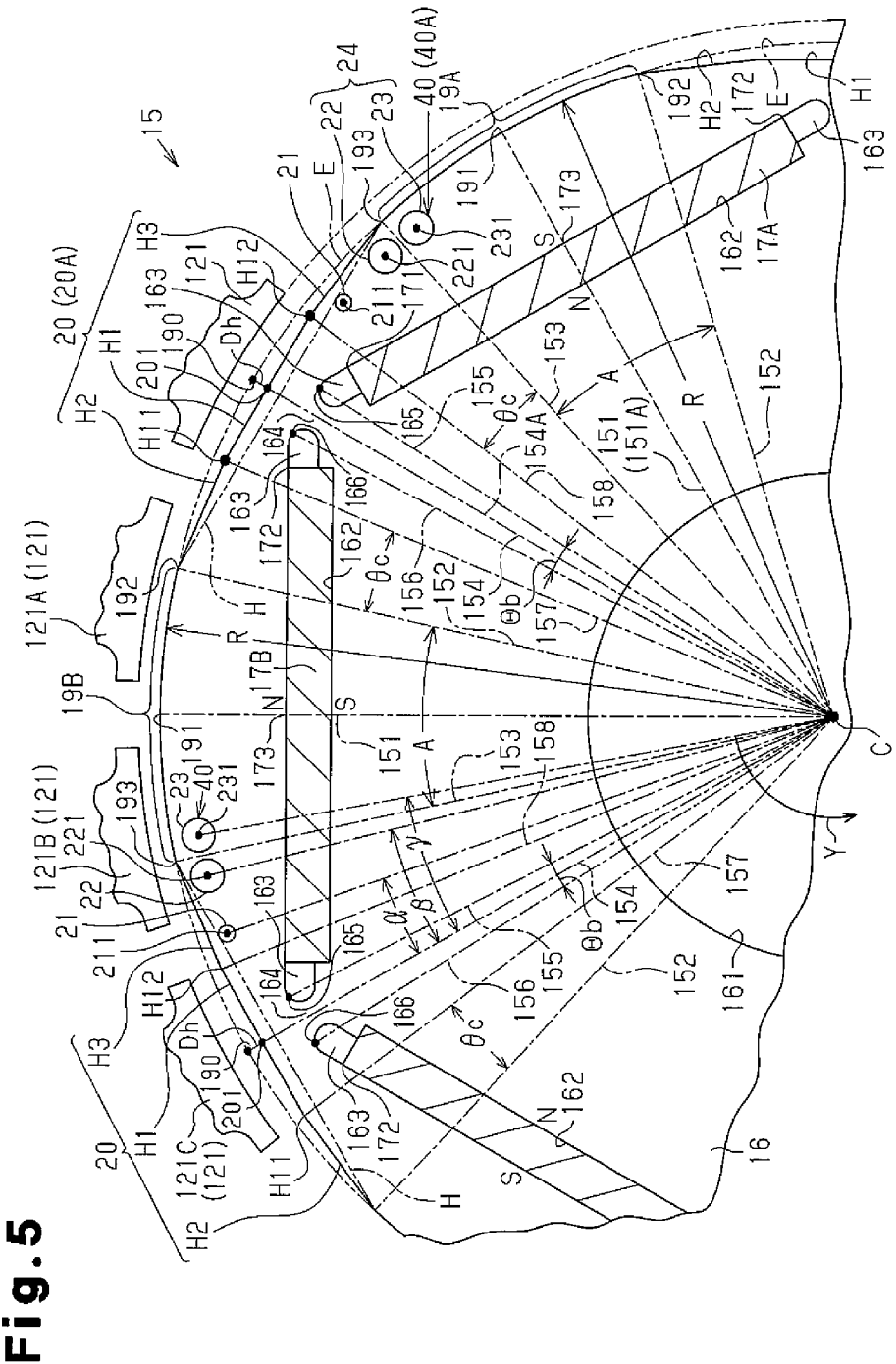
FIG. 5 is another enlarged cross-sectional view of FIG. 1A.

As shown in FIG. 5, the outer circumference of the rotor 15 includes three first circumferential portions 19A and three second circumferential portions 19B. The first circumferential portions 19A correspond to the first permanent magnets 17A. The second circumferential portions 19B correspond to the second permanent magnets 17B. The first circumferential portions 19A and the second circumferential portions 19B each have an angular width A. The first circumferential portions 19A and the second circumferential portions 19B each have a radius R and extend about the rotational axis C. Each radial line 151, which extends through the associated first permanent magnet 17A, intersects a center 191 of the corresponding first circumferential portion 19A. Each radial line 151 which extends through the associated second permanent magnet 17B intersects the center 191 of the corresponding second circumferential portion 19B. The centers 191 are also referred to as the circumferential centers.

Each of the first and the second circumferential portions 19A, 19B has a first edge 192 and a second edge 193 located opposite to the first edge 192. The rotor 15 defines radial lines 152, which extend through the first edge 192 of the first and second circumferential portions 19A, 19B. The rotor 15 also defines radial lines 153, which extend through the second edge 193 of the first and second circumferential portions 19A, 19B. The angular width between the radial line 152 that extends through the first edge 192 of the first circumferential portion 19A and the associated radial line 151 extending through the center 191 of the first circumferential portion 19A is equal to the angular width between the associated radial line 153 that extends through the second edge 193 of the first circumferential portion 19A and the radial line 151 extending through the center 191 of the first circumferential portion 19A. The angular width between the radial line 152 that extends through the first edge 192 of the second circumferential portion 19B and the associated radial line 151 extending through the center 191 of the second circumferential portion 19B is equal to the angular width between the associated radial line 153 that extends through the second edge 193 of the second circumferential portion 19B and the radial line 151 extending through the center 191 of the second circumferential portion 19B.

That is, the radial lines 151 function as circumferential portion bisectors, which bisect the first circumferential portions 19A or the second circumferential portions 19B in the circumferential direction. The term "bisect" here means to equally divide the angular width of the first circumferential portions 19A or the second circumferential portions 19B into two.

The first circumferential portions 19A corresponding to the first permanent magnets 17A are apart from the second circumferential portions 19B corresponding to the second permanent magnets 17B. Six convex portions 20 are formed on the outer circumference of the rotor 15. Each convex portion 20 connects one of the first circumferential portions 19A to the associated second circumferential portion 19B adjacent to the first circumferential portion 19A. That is, the outer circumference of the rotor 15 is alternately provided with a plurality of circumferential portions 19A, 19B and a plurality of convex portions 20. The convex portions 20 are formed on magnetic pole switching parts 164. The convex portions 20 bulge radially outward of the rotor 15. The convex portions 20 all have the same shape and the same size.

Some of the convex portions 20 each connect the second edge 193 of one of the first circumferential portions 19A to the first edge 192 of the associated second circumferential portion 19B. Some of the convex portions 20 each connect the first edge 192 of one of the first circumferential portions 19A to the second edge 193 of the associated second circumferential portion 19B. Each convex portion 20 is defined by a first straight line H1, which connects a second straight line H2 to a third straight line H3. The first straight line H1 is parallel to a virtual defining straight line H, which connects the first edge 192 to the associated second edge 193. The second straight line H2 connects a first end of the first straight line H1 to the first edge 192. The third straight line H3 connects a second end of the first straight line H1 to the second edge 193. That is, among the first straight line H1, the second straight line H2, and the third straight line H3, which define the convex portion 20, the second straight line H2 and the third straight line H3 are located on both sides of the first straight line H1.

The first straight line H1 and the second straight line H2, which are adjacent to each other, define an obtuse first angle portion H11, which bulges radially outward of the rotor 15. The first straight line H1 and the third straight line H3, which are adjacent to each other, define an obtuse second angle portion H12, which bulges radially outward of the rotor 15. The angle portions H11 and H12 are both ends of the first straight line H1.

The center of each first straight line H1 corresponds to one of the magnetic pole switching parts 164. As shown in FIG. 1B, the size of the gap between the teeth 121 and the outer circumference of the rotor 15 is the largest at a gap G corresponding to the magnetic pole switching part 164.

As shown in FIGS. 1B and 5, the rotor 15 defines six bisectors 154, each of which bisects the corresponding convex portion 20 into two in the circumferential direction. The bisectors 154 are straight lines, each of which extends from the rotational axis C to a center 201 of the corresponding convex portion 20. The term "bisect" here means to equally divide the angular width of the convex portions 20 into two. The bisectors 154 function as convex portion bisectors. The angle between each radial line 151 and the corresponding bisector 154 is 30°.

A virtual circumference E having the radius R includes the first circumferential portions 19A and the second circumferential portions 19B. Part of the virtual circumference E between each first edge 192 and the corresponding second edge 193 is bisected at a middle position 190. The middle position 190 lies along an extension of each bisector 154. A depth Dh shown in FIG. 5 represents the direct distance between the center 201 of the convex portion 20 and the middle position 190 of the virtual circumference E.

Each first straight line H1 is perpendicular to the corresponding bisector 154. The intersection between the first straight line H1 and the bisector 154 corresponds to the center 201 of the first straight line H1. The distance between the center 201 of the first straight line H1 and the first angle portion H11 is equal to the distance between the center 201 of the first straight line H1 and the second angle portion H12. As shown in FIG. 5, the angular width θc of the second straight line H2 about the rotational axis C is equal to the angular width θc of the third straight line H3 about the rotational axis C.

Each convex portion 20 is located inward of the virtual circumference E and outward of the corresponding virtual defining straight line H. That is, the convex portion 20 is located in a region between the virtual circumference E and the virtual defining straight line H. The convex portion 20 does not exist on the virtual circumference E or on the virtual defining straight line H. Thus, the angle portions H11, H12 are located radially inward of the virtual circumference E and radially outward of the virtual defining straight line H.

The second straight line H2 and the third straight line H3 have reflection symmetry, that is, left-right symmetry with respect to the bisector 154, which bisects the convex portion 20 in the circumferential direction. The first angle portion H11 and the second angle portion H12 have reflection symmetry, that is, left-right symmetry with respect to the bisector 154.

FIG. 6 shows a second extension line H21, which extends from the second straight line H2 to the virtual circumference E, and a third extension line H31, which extends from the third straight line H3 to the virtual circumference E. The second extension line H21 intersects the virtual circumference E at a position E2. The third extension line H31 intersects the virtual circumference E at a position E3. The second straight line H2 is longer than the second extension line H21. The third straight line H3 is longer than the third extension line H31.

The upper right part of FIG. 5 shows a first initial point 165 located on a wall surface defining the openings 163 corresponding to the first permanent magnet 17A and a second initial point 166 located on a wall surface defining the openings 163 corresponding to the second permanent magnet 17B. The first initial point 165 is an intersection between one of straight lines 155, which extend from the rotational axis C toward the first straight lines H1, and the wall surface defining the openings 163. The second initial point 166 is an intersection between one of straight lines 156, which extend from the rotational axis C toward the first straight lines H1, and the wall surface defining the openings 163.

The first initial point 165 and the second initial point 166 are defined as follows. A contact between a straight line which is a translation of the first straight line H1 and the wall surface defining the accommodating hole 162 (openings 163) corresponding to the first permanent magnet 17A is referred to as a point H01 (not shown). A contact between a straight line which is a translation of the third straight line H3 and the wall surface defining the accommodating hole 162 (openings 163) corresponding to the first permanent magnet 17A is referred to as a point H30 (not shown). Of the distance between the first straight line H1 and the point H01 and the distance between the third straight line H3 and the point H30, one of the points H01, H30 corresponding to the shorter distance will be a candidate for the first initial point 165.

Likewise, a contact between a straight line which is the translation of the first straight line H1 and the wall surface defining the accommodating hole 162 (openings 163) corresponding to the second permanent magnet 17B is referred to as a point H02 (not shown). A contact between a straight line which is the translation of the second straight line H2 and the wall surface defining the accommodating holes 162 (openings 163) corresponding to the second permanent magnet 17B is referred to as a point H20 (not shown). Of the distance between the first straight line H1 and the point H02 and the distance between the second straight line H2 and the point H20, one of the points H02, H20 corresponding to the shorter distance will be a candidate for the second initial point 166.

Depending on the shape of the accommodating holes 162 (openings 163), more than one or infinite number of the points H01, H30, H02, or H20 may be chosen as the candidates. For example, the straight line which is the translation of the first straight line H1 may linearly overlap the wall surface defining the accommodating hole 162 (openings 163). In this case, more than one or infinite number of points are chosen as the candidates for the first initial point 165, that is, a candidate point X1. Likewise, more than one or infinite number of points are chosen as the candidates for the second initial point 166, that is, a candidate point X2. In these cases, the candidate point X1 and the candidate point X2 that define the maximum angular width therebetween about the rotational axis C are employed as the first initial point 165 and the second initial point 166.

FIGS. 5 and 6 show the angular width between the first initial point 165 and the second initial point 166 about the rotational axis C, that is, an inter-bridge angle Θb. That is, the inter-bridge angle Θb represents the angular width between the straight line 155, which connects the rotational axis C to the first initial point 165, and the straight line 156, which connects the rotational axis C to the second initial point 166.

FIG. 5 shows a rotation direction Y of the rotor 15. The rotation direction Y is counterclockwise direction in FIG. 5.

As shown in FIGS. 1B and 5, the rotor core 16 includes six first magnetic flux blocking bores 21, six second magnetic flux blocking bores 22, and six third magnetic flux blocking bores 23. The first magnetic flux blocking bores 21, the second magnetic flux blocking bores 22, and the third magnetic flux blocking bores 23 extend through the rotor core 16 along the rotational axis C. The first magnetic flux blocking bores 21, the second magnetic flux blocking bores 22, and the third magnetic flux blocking bores 23 are separated from one another. Each of the first magnetic flux blocking bores 21 defines a first magnetic flux blocking section. Each of the second magnetic flux blocking bores 22 defines a second magnetic flux blocking section. Each of the third magnetic flux blocking bores 23 defines a third magnetic flux blocking section.

The rotor core 16 has six magnetic flux blocking regions 40. The magnetic flux blocking regions 40 each have one of the first magnetic flux blocking bores 21, one of the second magnetic flux blocking bores 22, and one of the third magnetic flux blocking bores 23.

For the convenience of explanation, the radial line 151 shown at the right portion in FIGS. 1B and 5 is referred to as a representative radial line 151A, and the convex portion 20 located toward the rotation direction Y from the representative radial line 151A is referred to as a representative convex portion 20A. The bisector 154 located toward the rotation direction Y from the representative radial line 151A is referred to as a representative bisector 154A. The magnetic flux blocking region 40 corresponding to the first permanent magnet 17A crossed by the representative radial line 151A is referred to as a representative magnetic flux blocking region 40A. The representative magnetic flux blocking region 40A is located in a range between the representative radial line 151A and the representative bisector 154A. That is, each of the magnetic flux blocking region 40 is located in a range between the radial line 151 and the bisector 154 adjacent to and preceding the radial line 151 in the rotation direction Y.

Of the two angle portions H11, H12 of the representative convex portion 20A, the second angle portion H12 is closer to the representative radial line 151A and is referred to as a representative angle portion. That is, the second angle portion H12 is closer to the radial line 151 than the first angle portion H11. A straight line 158 functions as a representative angle straight line, which connects the second angle portion H12 to the rotational axis C. The representative magnetic flux blocking region 40A is located within a range between the representative radial line 151A and the corresponding straight line 158. The first magnetic flux blocking bore 21 is located closer to the bisector 154 than the second magnetic flux blocking bore 22 and the third magnetic flux blocking bore 23.

The first magnetic flux blocking bores 21, the second magnetic flux blocking bores 22, and the third magnetic flux blocking bores 23 are all circular bores. The bore diameter of the second magnetic flux blocking bores 22 is equal to the bore diameter of the third magnetic flux blocking bores 23. The bore diameter of the first magnetic flux blocking bores 21 is smaller than the bore diameter of the second magnetic flux blocking bores 22 and the bore diameter of the third magnetic flux blocking bores 23. In the first embodiment, the bore diameter of the first magnetic flux blocking bores 21 is set to 0.6 mm. The bore diameter of the second magnetic flux blocking bores 22 and the bore diameter of the third magnetic flux blocking bores 23 are set to 1.4 mm.

The first magnetic flux blocking bores 21, the second magnetic flux blocking bores 22, and the third magnetic flux blocking bores 23 are all separate from the outer circumference of the rotor 15 by a distance greater than or equal to the thickness of each core plate 18. Otherwise, it is difficult to secure a required strength of the outer circumference of the rotor 15. The first embodiment easily secures the strength of the rotor 15 at a portion between the outer circumference of the rotor 15 and the first, second, and third magnetic flux blocking bores 21, 22, 23.

As shown in FIGS. 5 and 6, the first magnetic flux blocking bore 21 in the representative magnetic flux blocking section 40A is located to partially overlap a position rotated from the representative bisector 154A in a direction opposite to the rotation direction Y by an angle α. That is, each first magnetic flux blocking bore 21 is located to partially overlap a position rotated from the bisector 154 (154A) in a direction opposite to the rotation direction Y by an angle α. In other words, the first magnetic flux blocking bore 21 is located to partially overlap a position retarded from the bisector 154 (154A) with respect to the rotation direction Y by the angle α. A center 211 of the first magnetic flux blocking bore 21 is located at a position rotated from the bisector 154 (154A) in a direction opposite to the rotation direction Y by the angle α.

Each second magnetic flux blocking bore 22 is located to partially overlap a position rotated from the bisector 154 (154A) in a direction opposite to the rotation direction Y by an angle β. The angle β is greater than the angle α (β>α). A center 221 of the second magnetic flux blocking bore 22 is located at a position rotated from the bisector 154 (154A) in a direction opposite to the rotation direction Y by the angle β. Each third magnetic flux blocking bore 23 is located to partially overlap a position rotated from the bisector 154 (154A) in a direction opposite to the rotation direction Y by an angle γ. The angle γ is greater than the angle β (γ>β). A center 231 of the third magnetic flux blocking bore 23 is located at a position rotated from the bisector 154 (154A) in a direction opposite to the rotation direction Y by the angle γ.

In the first embodiment, α is set to 8.5°, β is set to 15.6°, and γ is set to 20°.

The first magnetic flux blocking bores 21, the second magnetic flux blocking bores 22, and the third magnetic flux blocking bores 23 set as described above are located in the vicinity of the third straight lines H3.

Figure 7A:
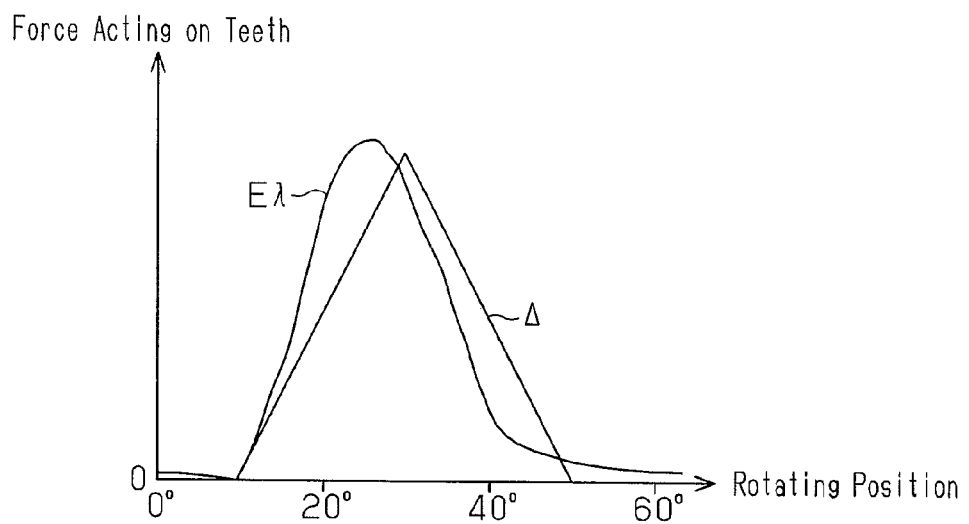
FIG. 7A is a graph showing force applied to one tooth and rotational position of the rotor.
Figure 7B:
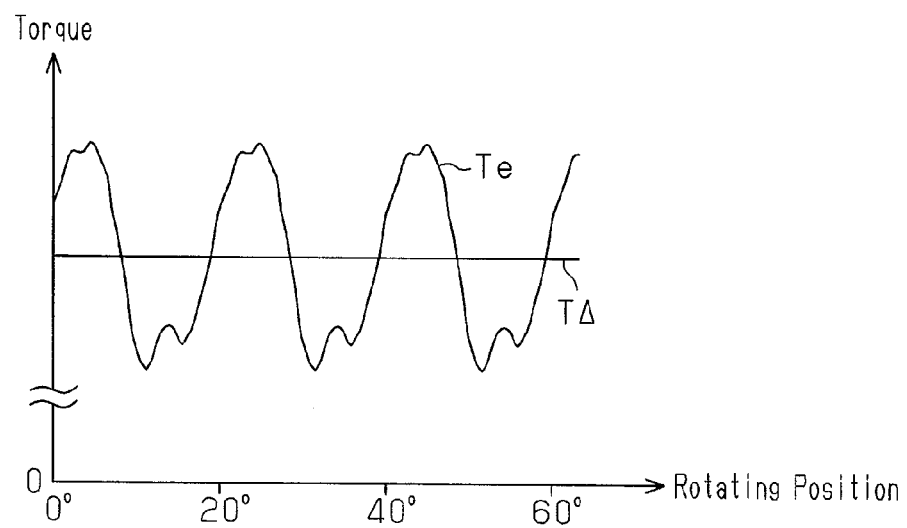
FIG. 7B is a graph showing torque fluctuation based on the force of FIG. 7A and the rotating position of the rotor.

The graph of FIG. 7A shows the relationship between the rotating position of the rotor and the force acting on one tooth 121. Hereinafter, the force acting on one tooth 121 will be referred to as tooth torque. FIG. 7A shows an ideal waveform Δ and an actual waveform Eλ. The ideal waveform Δ and the abscissa axis define an isosceles triangle. In the isosceles triangle, the angular spacing between the starting end and the terminating end on the abscissa axis is 40°. A straight line TΔ shown in the graph of FIG. 7B is obtained by synthesizing such ideal waveform Δ relating to all the teeth 121. That is, if the tooth torque represented by the ideal waveform Δ acts on every tooth 121 of the rotor, the output torque of the rotor will be constant. As a result, torque pulsation, that is, the torque ripple becomes zero. Hereinafter, the output torque of the rotor will be referred to as the total torque.

The actual waveform Eλ in the graph of FIG. 7A shows the relationship between the rotating position of a round rotor (not shown) having the circumferential surface with the radius R along the entire outer circumference and the tooth torque acting on one tooth 121. A synthesized waveform Te shown in the graph of FIG. 7B is obtained by synthesizing the actual waveform Eλ relating to all the teeth 121. That is, if the tooth torque acting on one tooth 121 is the force shown by the actual waveform Eλ, the total torque having the torque ripple, which is not zero, is generated. The torque ripple becomes smaller as the shape of the actual waveform Eλ becomes closer to the shape of the ideal waveform Δ.

Figure 17:
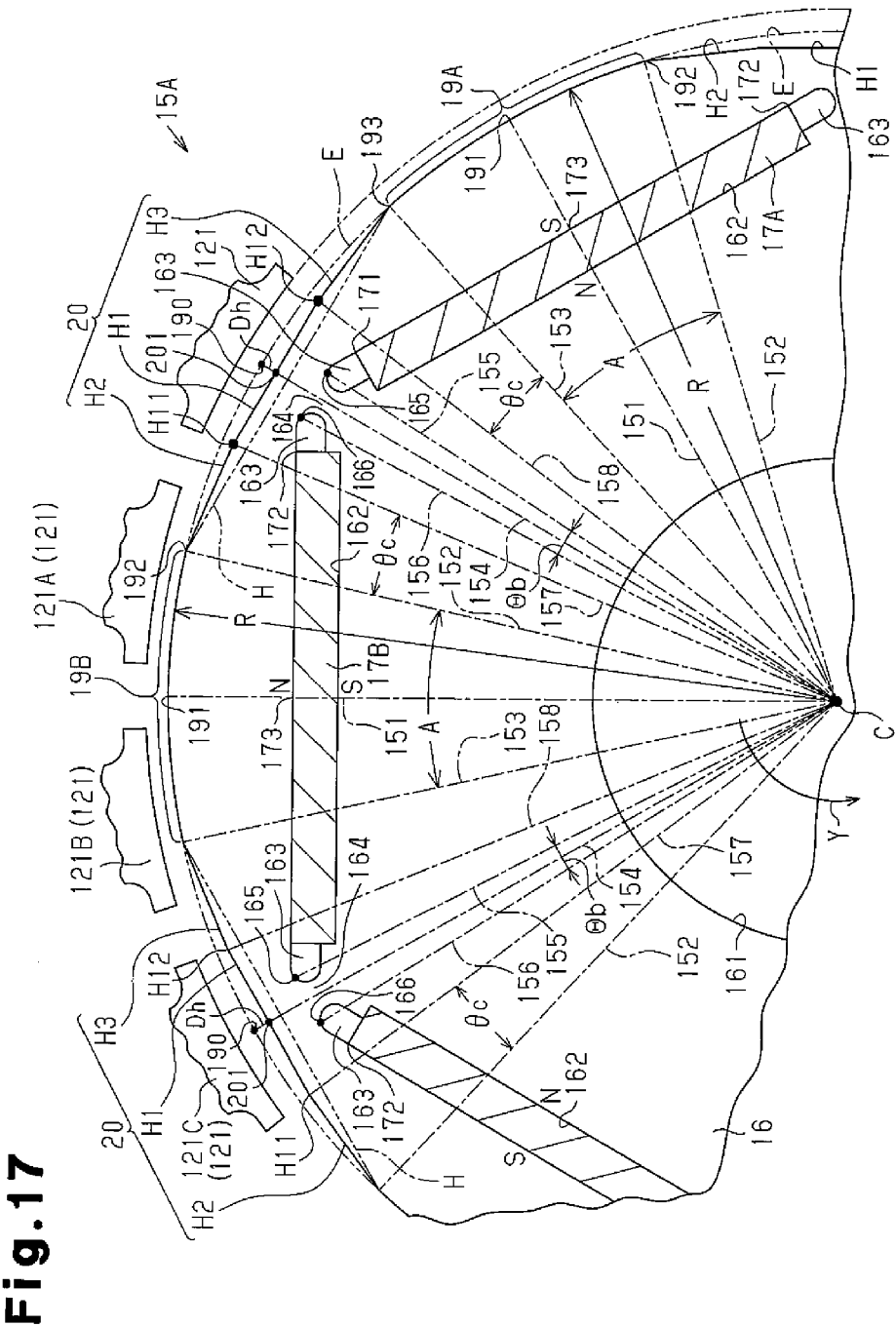
FIG. 17 is a partial cross-sectional view illustrating the first comparative rotor 15A.

FIG. 17 shows a first comparative rotor 15A to be compared with the rotor 15. The first comparative rotor 15A has the same configuration as the rotor 15 except that the first magnetic flux blocking bores 21, the second magnetic flux blocking bores 22, and the third magnetic flux blocking bores 23 are not provided. The first comparative rotor 15A includes convex portions 20. The graph of FIG. 8 shows first comparative waveforms Eλ11, Eλ12, Eλ13, which represent the relationship between the rotating position of the first comparative rotor 15A and the tooth torque acting on one tooth 121.

Figure 8:
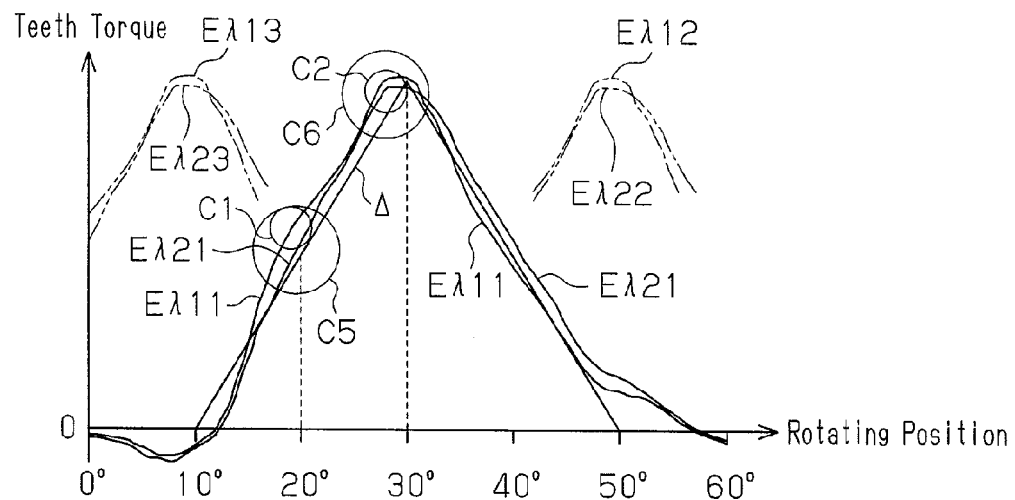
FIG. 8 is a graph showing force applied to one tooth and the rotating position of the rotor when using a first comparative rotor 15A of FIG. 17 and the rotor 15 of FIG. 1A.

The graph of FIG. 8 further shows the waveforms Eλ21, Eλ22, Eλ23, which represent the relationship between the rotating position of the rotor 15 shown in FIG. 1A and the tooth torque of one tooth 121.

Figure 9:
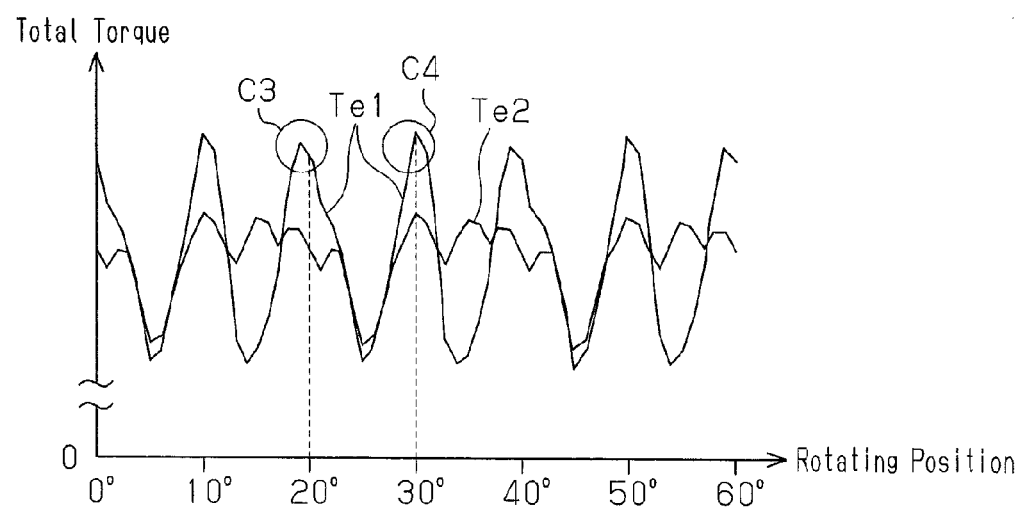
FIG. 9 is a graph showing the total torque and the rotating position of the rotor when using the first comparative rotor 15A of FIG. 17 and the rotor 15 of FIG. 1A.

The abscissa axes in FIGS. 8 and 9 represent the rotating position of the rotor 15. The rotating position of the rotor 15 shown in FIGS. 5 and 6 is specified as 0°. In the case shown in FIGS. 5 and 6, each radial line 151 (151A) is located at the middle of two teeth 121 adjacent to each other. The rotor 15 rotated from the state shown in FIGS. 5 and 6 in the rotation direction Y by 30° is located at the rotating position of 30°. The radial lines 151 (151A) are shifted to the position of the bisectors 154 (154A) shown in FIGS. 5 and 6.

FIGS. 5 and 17 show teeth 121A, 121B, 121C arranged along the rotation direction Y. The first comparative waveform Eλ11 of FIG. 8 represents the tooth torque acting on the tooth 121A of FIG. 17. The first comparative waveform Eλ12 represents the tooth torque acting on the tooth 121B of FIG. 17. The first comparative waveform Eλ13 represents the tooth torque acting on the tooth 121C of FIG. 17. The first comparative waveforms Eλ11, Eλ12, Eλ13 are phase shifted from each other.

The waveform Eλ21 of FIG. 8 represents the tooth torque acting on the tooth 121A of FIG. 5. The waveform Eλ22 represents the tooth torque acting on the tooth 121B of FIG. 5. The waveform Eλ23 represents the tooth torque acting on the tooth 121C of FIG. 5. The waveforms Eλ21, Eλ22, Eλ23 are phase shifted from each other.

By synthesizing the first comparative waveforms Eλ11, Eλ12, Eλ13 relating to all the teeth 121, a comparative synthesized waveform Te1 in the graph of FIG. 9 is obtained. By synthesizing the waveforms Eλ21, Eλ22, Eλ23 relating to all the teeth 121, a synthesized waveform Te2 in the graph of FIG. 9 is obtained.

As is apparent by comparing the comparative synthesized waveform Te1 with the synthesized waveform Te2, the torque ripple of the rotating electric machine M when using the rotor 15 shown in FIG. 1A is smaller than the torque ripple of the rotating electric machine when using the first comparative rotor 15A shown in FIG. 17.

Hereinafter, among the first comparative waveforms Eλ11, Eλ12, Eλ13, the first comparative waveform Eλ11 is used as a representative. Among the waveforms Eλ21, Eλ22, Eλ23, the waveform Eλ21 is used as a representative.

The graph of FIG. 8 shows the first comparative waveform Eλ11 and the waveform Eλ21 obtained through FEM (Finite Element Method) analysis performed using a computer. The graph of FIG. 9 also shows the comparative synthesized waveform Te1 and the synthesized waveform Te2 obtained through FEM analysis. In the cases of FIGS. 8 and 9, conditions of FEM analysis are as follows: the angular width A=25.5°, the angular width θc=12.5°, the inter-bridge angle Θb=5.2°, the depth Dh=0.5 mm, and the radius R=25.2 mm.

Figure 10A:
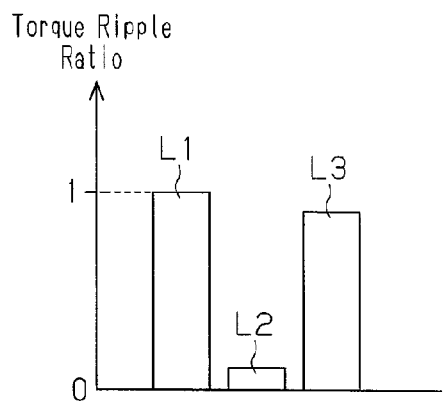
FIG. 10A is a bar graph showing the torque ripple ratio and the order component ratio of the torque ripple when using the first comparative rotor 15A of FIG. 17.

A case of six poles and eighteen slots will now be described. The bar graph of FIG. 10A shows comparison between the magnitude of the torque ripple of the total torque (comparative synthesized waveform Te1 of FIG. 9) of the rotating electric machine when using the first comparative rotor 15A shown in FIG. 17 and the magnitude of the order component of the torque ripple. The order component of the torque ripple corresponds to a specific order obtained by Fourier series expansion of the total torque (Te1). A first bar L1 represents the torque ripple ratio of the total torque (Te1 of FIG. 9). A second bar L2 represents the order component ratio of the torque ripple in the fundamental order (=18). A third bar L represents the order component ratio of the torque ripple in the order (=36) double the fundamental order. The torque ripple ratio of the first bar L1 is one.

Figure 10B:
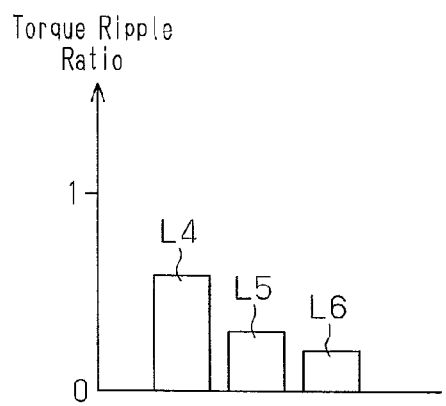
FIG. 10B is a bar graph showing the torque ripple ratio and the order component ratio of the torque ripple when using the rotor 15 of FIG. 1A.

The bar graph shown in FIG. 10B shows the comparison between the magnitude of the torque ripple of the total torque (synthesized waveform Te2 of FIG. 9) when the rotor 15 is used, and the magnitude of the order component of the torque ripple in a specific order obtained by Fourier series expansion of the total torque (Te2). A fourth bar L4 shows the torque ripple ratio of the total torque (Te2 of FIG. 9). A fifth bar L5 represents the order component ratio of the torque ripple in the fundamental order (=18). A sixth bar L6 represents the order component ratio of the torque ripple in the order (=36) double the fundamental order. Hereinafter, the order component of the torque ripple in the fundamental order (=18) will be referred to as a fundamental order component. The order component of the torque ripple in the order (=36) double the fundamental order will be referred to as a 36th order component.

FIGS. 10A and 10B show the result of FEM analysis performed using a computer.

Comparing the first bar L1 with the fourth bar L4, the magnitude of the torque ripple ratio of the comparative synthesized waveform Te1 is greater than the torque ripple ratio of the synthesized waveform Te2.

Comparing the second bar L2 with the fifth bar L5, the magnitude of the fundamental order component ratio of the rotor 15 is greater than the fundamental order component ratio of the first comparative rotor 15A. However, comparing the third bar L3 with the sixth bar L6, the magnitude of the 36th order component ratio of the rotor 15 is smaller than that of the first comparative rotor 15A. The 36th order component ratio (third bar L3) of the first comparative rotor 15A is close to the torque ripple ratio (first bar L1) of the total torque of the first comparative rotor 15A. However, the magnitudes of the fundamental order component ratio (fifth bar L5) and the 36th order component (sixth bar L6) of the rotor 15 are less than or equal to half the 36th order component (third bar L3) of the first comparative rotor 15A.

That is, the 36th order component ratio (sixth bar L6) of the rotor 15 is reduced to a large extent as compared to the 36th order component ratio (third bar L3) of the first comparative rotor 15A. As a result, the magnitude of the torque ripple of the total torque when using the rotor 15 is smaller than the torque ripple of the total torque when using the first comparative rotor 15A.

In a region enclosed by a first indicator circle C1 and a region enclosed by a second indicator circle C2 in the graph of FIG. 8, the amount by which the first comparative waveform Eλ11 is displaced upward from the ideal waveform Δ is greater than that of the other part of the first comparative waveform Eλ11. As the amount by which the first comparative waveform Eλ11 is displaced from the ideal waveform Δ is increased in the region enclosed by the first indicator circle C1 and the region enclosed by the second indicator circle C2, peaks of the comparative synthesized waveform Te1 in the graph of FIG. 9 become higher, and the torque ripple is increased. The peaks of the comparative synthesized waveform Te1 includes a peak in a region enclosed by a third indicator circle C3, and a peak in a region enclosed by a fourth indicator circle C4. The position of the peaks of the comparative synthesized waveform Te1 represents the position of the peaks of the 36th order component. Thus, by making the region enclosed by the first indicator circle C1 and part of the first comparative waveform Eλ11 in the vicinity of the first indicator circle C1, and the region enclosed by the second indicator circle C2 and part of the first comparative waveform Eλ11 in the vicinity of the second indicator circle C2 closer to the ideal waveform Δ, the peaks of the comparative synthesized waveform Te1 are reduced.

The first magnetic flux blocking bores 21, the second magnetic flux blocking bores 22, and the third magnetic flux blocking bores 23 are provided so that the region enclosed by the first indicator circle C1 and part of the first comparative waveform Eλ11 in the vicinity of the first indicator circle C1, and the region enclosed by the second indicator circle C2 and part of the first comparative waveform Eλ11 in the vicinity of the second indicator circle C2 approach the ideal waveform Δ. In a region enclosed by a fifth indicator circle C5 and a region enclosed by a sixth indicator circle C6 in FIG. 8, the waveform Eλ21 is closer to the ideal waveform Δ than the first comparative waveform Eλ11. That is, as a result of providing the first magnetic flux blocking bores 21, the second magnetic flux blocking bores 22, and the third magnetic flux blocking bores 23 in the rotor 15 so that the waveform Eλ21 approaches the ideal waveform Δ, a synthesized waveform Te2 shown in FIG. 9 is obtained. The peaks of the synthesized waveform Te2 is lower than the peaks of the comparative synthesized waveform Te1.

The present inventors found the following fact by performing the FEM analysis. That is, part of the tooth torque corresponding to the region enclosed by the first indicator circle C1 and the region enclosed by the second indicator circle C2 is concentratedly generated at part of the rotor core 16 in the vicinity of each third straight line H3 shown in FIG. 5. Based on the result of the FEM analysis, the first magnetic flux blocking bores 21, the second magnetic flux blocking bores 22, and the third magnetic flux blocking bores 23 are provided in the region where the tooth torque is concentratedly generated, that is, in the vicinity of the third straight lines H3. The first magnetic flux blocking bores 21, the second magnetic flux blocking bores 22, and the third magnetic flux blocking bores 23 provided in the vicinity of the third straight lines H3 increase the magnetic resistance in the vicinity of the third straight lines H. As a result, the regions enclosed by the fifth indicator circle C5 and the sixth indicator circle C6 shown in FIG. 8 and part of the waveform Eλ21 in the vicinity thereof are closer to the ideal waveform Δ.

Each first magnetic flux blocking bore 21 is provided so as to partially overlap a position retarded from the associated bisector 154 (154A) by an angle of 8.5° with respect to the rotation direction Y. Each second magnetic flux blocking bore 22 is provided so as to partially overlap a position retarded from the associated bisector 154 (154A) by an angle of 15.6°. Each third magnetic flux blocking bore 23 is provided so as to partially overlap a position retarded from the associated bisector 154 (154A) by an angle of 20°. The positions specified as above are particularly suitable for reducing the peaks of the 36th order component of the total torque.

The bore diameter of the first magnetic flux blocking bores 21 is smaller than the bore diameter of the second magnetic flux blocking bores 22 and the bore diameter of the third magnetic flux blocking bores 23. However, the first magnetic flux blocking bores 21 greatly contribute to reducing the peaks of the 36th order component of the total torque. The second magnetic flux blocking bores 22 and the third magnetic flux blocking bores 23 contribute to reducing the peaks of the fundamental order (18th) of the total torque (output torque). Each first magnetic flux blocking bore 21 serves as a first magnetic flux blocking region, which functions to suppress the torque ripple in the order component double the fundamental order of the output torque. Each second magnetic flux blocking bore 22 and the associated third magnetic flux blocking bore 23 serve as a second magnetic flux blocking region 24, which functions to suppress the torque ripple in the fundamental order component of the output torque. The second magnetic flux blocking region 24 functions as a compound magnetic flux blocking region, which includes the second magnetic flux blocking bore 22 and the third magnetic flux blocking bore 23. The first magnetic flux blocking region (21) functions as a magnetic flux blocking region closer to the bisector 154 (154A). The second magnetic flux blocking region 24 functions as a magnetic flux blocking region closer to the radial line 151 (151A).

Figure 10C:
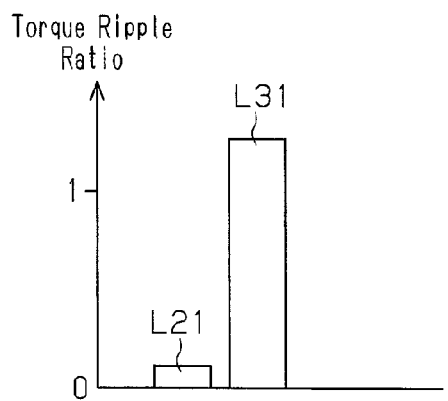
FIG. 10C is a bar graph showing the order component ratio of the torque ripple when using the first comparative rotor 15A of FIG. 17.
Figure 10D:
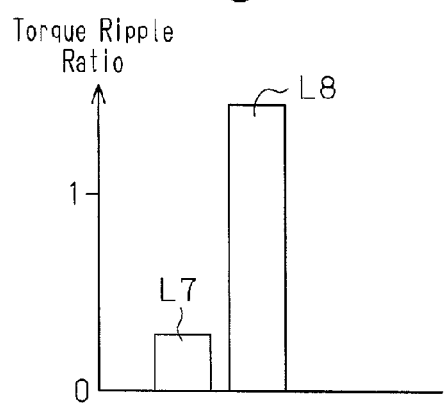
FIG. 10D is a bar graph showing the order component ratio of the torque ripple when using a second comparative rotor 25 of FIG. 18.

The graph of FIG. 10C shows the magnitudes of the fundamental order component ratio and the 36th order component ratio obtained by Fourier series expansion of the total torque when using the first comparative rotor 15A. The graph of FIG. 10D shows the magnitudes of the fundamental order component ratio and the 36th order component ratio obtained by Fourier series expansion of the total torque when using a second comparative rotor 25 shown in FIG. 18. The second comparative rotor 25 shown in FIG. 18 is prepared to compare the fundamental order component ratio and the 36th order component ratio with those of the first comparative rotor 15A.

Figure 18:
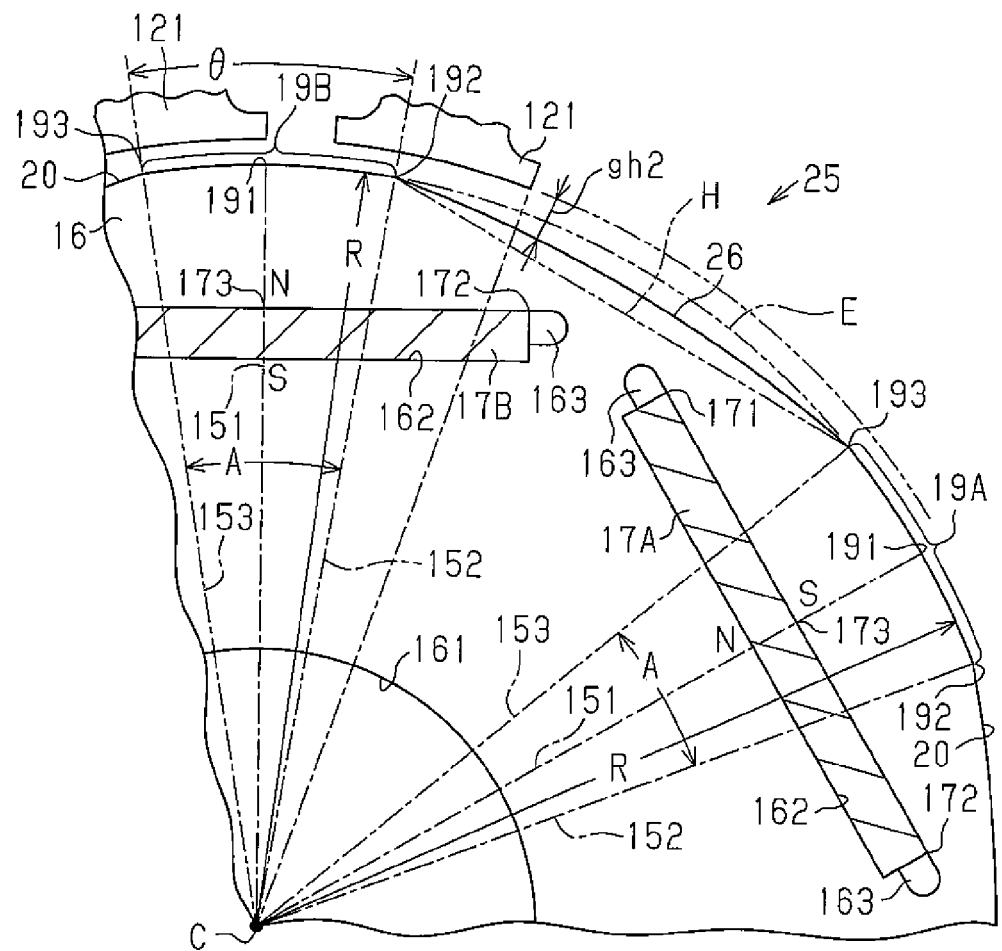
FIG. 18 is a partial cross-sectional view illustrating the second comparative rotor 25.

As shown in FIG. 18, arcuate convex portions 26 are formed on the outer circumferential surface of the second comparative rotor 25. Each arcuate convex portion 26 defines an arcuate circumferential surface, which bulges radially outward of the second comparative rotor 25. Each arcuate convex portion 26 connects one of the first circumferential portions 19A to the second circumferential portion 19B adjacent to the first circumferential portion 19A.

Each arcuate convex portion 26 connects the second edge 193 of one of the first circumferential portions 19A to the first edge 192 of the second circumferential portion 19B adjacent to the second edge 193. The arcuate convex portions 26 are defined by a radius greater than the radius R of the circumferential portions 19A, 19B. The arcuate convex portions 26 on the outer circumference of the rotor core 16 all have the same shape and the same size. Each arcuate convex portion 26 is located inward of the virtual circumference E and outward of the virtual defining straight line H. That is, the arcuate convex portion 26 is located in a region between the virtual circumference E and the virtual defining straight line H. The arcuate convex portion 26 is not located on the virtual circumference E or on the virtual straight line H.

A bar L21 of FIG. 10C shows the fundamental order component ratio (18th order component ratio) of the torque ripple when using the first comparative rotor 15A. A bar L31 shows the 36th order component ratio of the torque ripple when using the first comparative rotor 15A. A seventh bar L7 of FIG. 10D shows the fundamental order component ratio (18th order component ratio) of the torque ripple when using the second comparative rotor 25. An eighth bar L8 shows the 36th order component ratio of the torque ripple when using the second comparative rotor 25.

According to the result of the FEM analysis of FIGS. 10C and 10D, the fundamental order component ratio (bar L21) of the first comparative rotor 15A shown in FIG. 17 is smaller than the fundamental order component ratio (seventh bar L7) of the second comparative rotor 25 shown in FIG. 18. The 36th order component ratio (bar L31) of the first comparative rotor 15A is smaller than the 36th order component ratio (eighth bar L8) of the second comparative rotor 25.

The result as shown in FIGS. 10C and 10D is obtained for the following reasons, which will be described with reference to FIGS. 11 to 16F.

Figure 11:
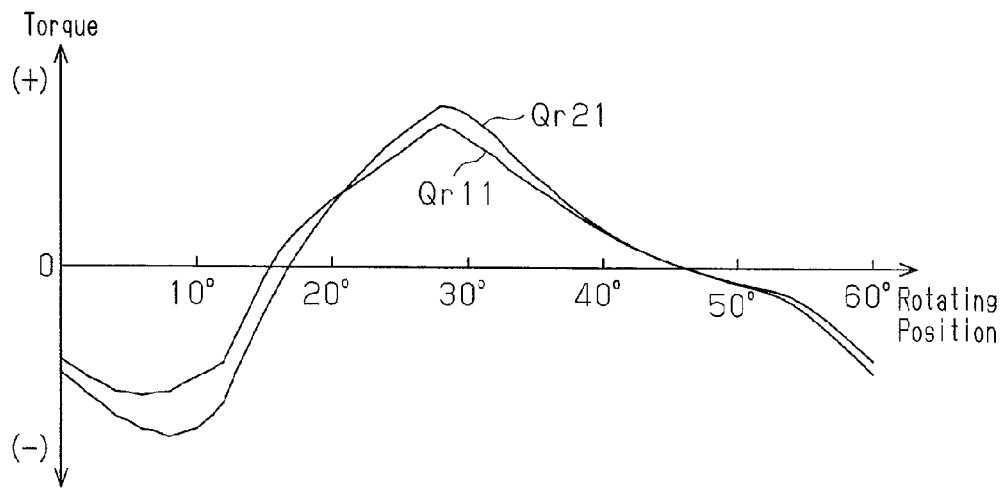
FIG. 11 is a graph showing changes in the reluctance torque of a single tooth in accordance with the rotating position of the rotor when using the first comparative rotor 15A of FIG. 17 and the second comparative rotor 25 of FIG. 18.

The graph of FIG. 11 shows the fluctuation of the reluctance torque of a single tooth 121. A curve Qr11 represents the fluctuation of the reluctance torque when using the first comparative rotor 15A shown in FIG. 17. A curve Qr21 represents the fluctuation of the reluctance torque when using the second comparative rotor 25 shown in FIG. 18. The curve Qr11 and the curve Qr21 in the graph of FIG. 11 are example of the FEM analysis performed using a computer. In this case, the FEM analysis is performed under the following conditions: the angular width $A=28°$, the angular width $\theta c=13°$, the interbridge angle $\Theta b=5.2°$, the depth $Dh=0.3$ mm, and the radius $R=25.5$ mm.

Figure 12A:
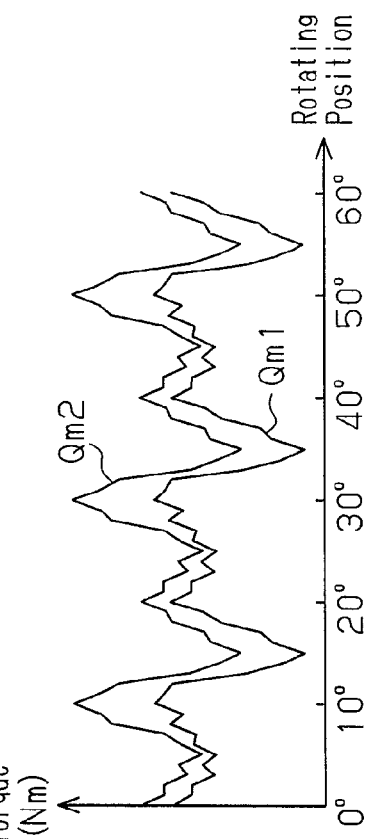
FIG. 12A is a graph showing changes in the synthesized reluctance torque, which is obtained by synthesizing the reluctance torques of teeth represented by FIG. 11, in accordance with the rotating position of the rotor.

A curve Qr12 in the graph of FIG. 12A represents the fluctuation of the synthesized reluctance torque obtained by synthesizing the curve Qr11 of each of the eighteen teeth 121 shown in FIG. 11. A curve Qr22 represents the synthesized reluctance torque obtained by synthesizing the curve Qr21 of each of the eighteen teeth 121 shown in FIG. 11.

Figure 12B:
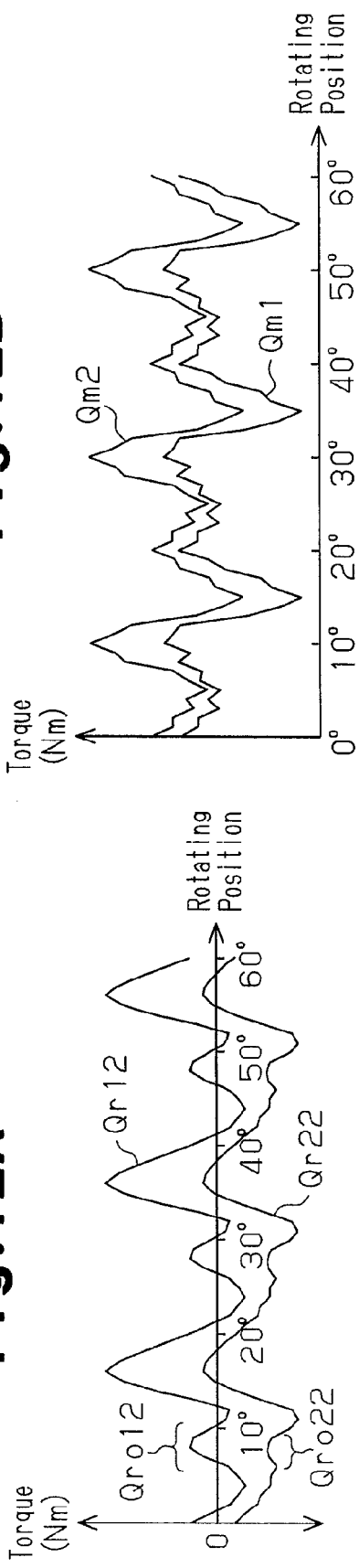
FIG. 12B is a graph showing changes in the magnetic torque in accordance with the rotating position of the rotor when using the first comparative rotor 15A of FIG. 17 and the second comparative rotor 25 of FIG. 18.

Hereinafter, the torque of the permanent magnets 17A, 17B is referred to as magnetic torque. A curve Qm1 in the graph of FIG. 12B represents the fluctuation of the magnetic torque when using the first comparative rotor 15A. A curve Qm2 represents the magnetic torque when using the second comparative rotor 25.

Figure 12C:
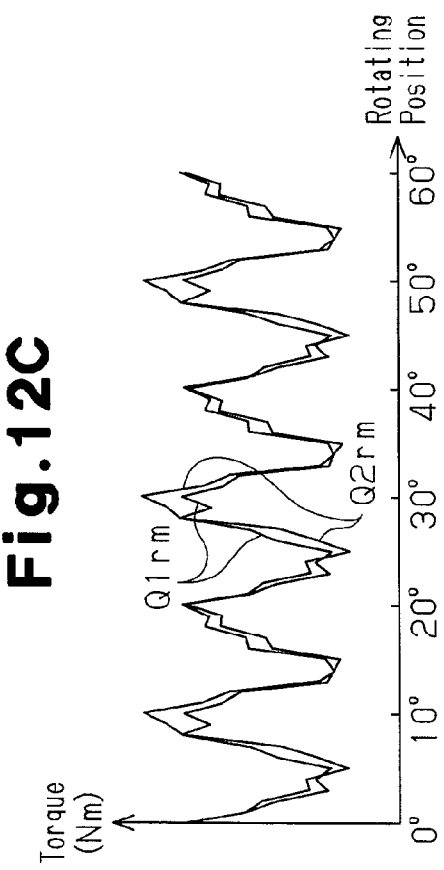
FIG. 12C is a graph showing the synthesized torque waveform, which is obtained by synthesizing the synthesized reluctance torque of FIG. 12A and the magnetic torque of FIG. 12B.

A curve Q1rm of the graph of FIG. 12C is a torque waveform obtained by synthesizing the curve Qr12 of FIG. 12A and the curve Qm1 of FIG. 12B. A curve Q2rm in the graph of FIG. 12C is a torque waveform obtained by synthesizing the curve Qr22 of FIG. 12A with the curve Qm2 of FIG. 12B. That is, the curve Q1rm is a torque waveform obtained by the FEM analysis of the first comparative rotor 15A having the convex portions 20. The curve Q2rm is a torque waveform obtained by the FEM analysis of the second comparative rotor 25 of FIG. 18.

Comparing the curve Q1rm with the curve Q2rm, the torque ripple represented by the curve Q1rm is apparently smaller than the torque ripple represented by the curve Q2rm. This difference is based on the difference between the raised degree of a raised part Qro12 in the curve Qr12 and the raised degree of a raised part Qro22 in the curve Qr22 of FIG. 12A. The difference in the raised degree of the raised parts Qro12, Qro22 is mainly due to the difference between the change in a first air gap gh1 and the change in a second air gap gh2. As shown in FIG. 6, the first air gap gh1 represents the size of an interval between the convex portion 20 and the teeth 121. As shown in FIG. 18, the second air gap gh2 represents the size of an interval between the arcuate convex portion 26 and the teeth 121.

Figure 13A:
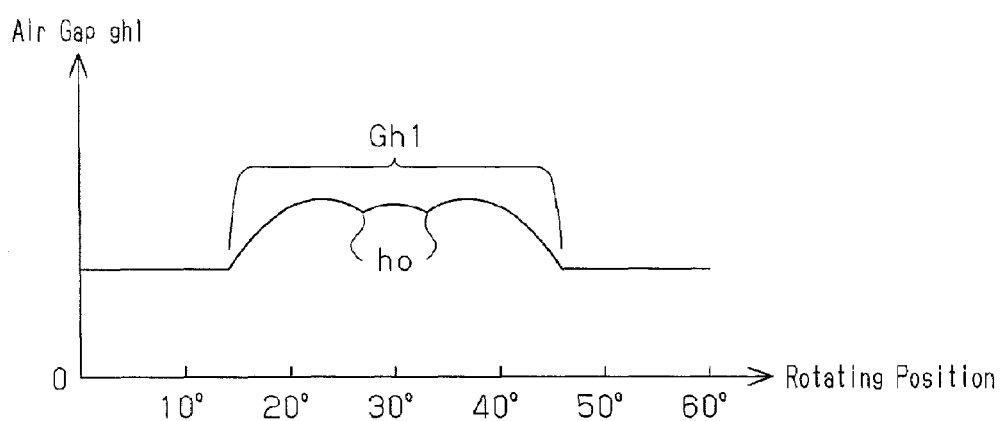
FIG. 13A is a graph showing changes in the air gap in accordance with the rotating position of the rotor when using the first comparative rotor 15A of FIG. 17.
Figure 13B:
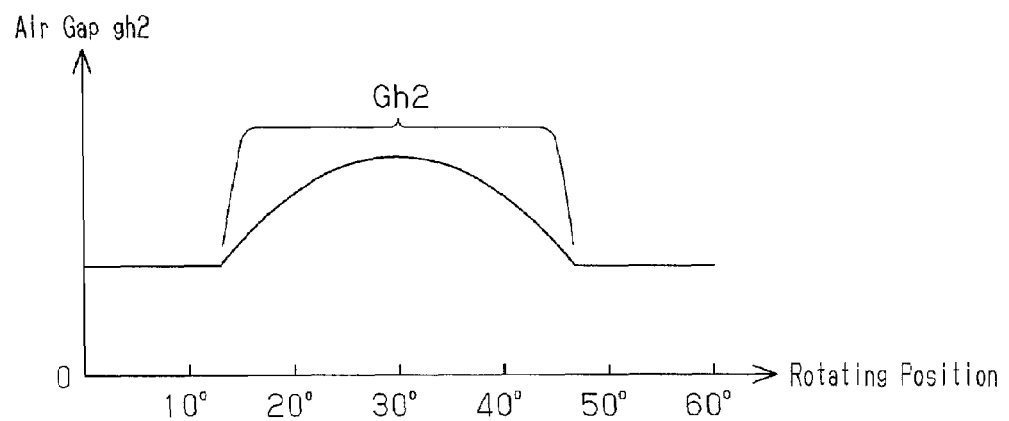
FIG. 13B is a graph showing changes in the air gap in accordance with the rotating position of the rotor when using the second comparative rotor 25 of FIG. 18.

A curve Gh1 in the graph of FIG. 13A shows changes in the first air gap gh1. A curve Gh2 in the graph of FIG. 13B shows changes in the second air gap gh2. The change in the second air gap gh2 represented by the curve Gh2 has a pattern of transitioning from a monotone increase to a maximum and then transitioning to a monotone decrease. The change in the first air gap gh1 represented by the curve Gh1 has a pattern including a pair of inverting portions ho that suddenly invert from monotone decrease to monotone increase. The pair of inverting portions ho are generated because of the angle portions H11, H12. That is, the existence of the angle portions H11, H12 increases the raised degree of the raised part Qro12 of the curve Qr12.

Synthesizing of the curve Qr12 representing the synthesized reluctance torque having the raised part Qro12 and the curve Qm1 of the magnetic torque reduces the torque ripple as shown by the curve Q1rm in FIG. 12C. Synthesizing of the curve Qr22 of the synthesized reluctance torque having the raised part Qro22 and the curve Qm2 of the magnetic torque also reduces the torque ripple as shown by the curve Q2rm in FIG. 12C. However, the torque ripple shown by the curve Q1rm in FIG. 12C is smaller than the torque ripple shown by the curve Q2rm in FIG. 12C.

The difference between the torque ripple of the curve Q1rm and the torque ripple of the curve Q2rm will now be described with reference to FIGS. 14A to 16F.

The torque ripple of the curve Q1rm differs from the torque ripple of the curve Q2rm for the following two reasons.

<1> The difference between the amplitude of the component of the fundamental order (18th order) in the reluctance torque and the amplitude of the component of the fundamental order (18th order) in the magnetic torque is smaller for the curve Q1rm than for the curve Q2rm.

<2> The difference between the phase of the component of the fundamental order (18th order) in the reluctance torque and the phase of the component of the fundamental order (18th order) in the magnetic torque is closer to the antiphase for the curve Q1rm than for the curve Q2rm.

The reasons <1> and <2> are described below.

Figure 14A:
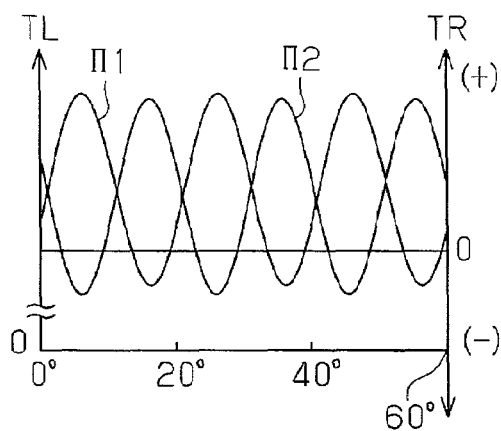
FIG. 14A is a graph showing the fundamental order component waveform of the magnetic torque and the fundamental order component waveform of the reluctance torque when using the first comparative rotor 15A of FIG. 17 to show the torque ripple of the curve Q1rm of FIG. 12C.

A curve π1 in the graph of FIG. 14A represents the waveform of the component of the fundamental order (18th order) in the magnetic torque when the first comparative rotor 15A having the convex portions 20 as shown in FIG. 17 is used. A curve n2 represents the waveform of the component of the fundamental order (18th order) in the reluctance torque when the first comparative rotor 15A is used. The curve π1 is on the coordinates indicated by the abscissa axis (rotating position)

and the ordinate axis TL (magnitude of torque) on the left side. The curve π2 is on the coordinates indicated by the abscissa axis (rotating position) and the ordinate axis TR (magnitude of torque) on the right side.

Figure 14B:
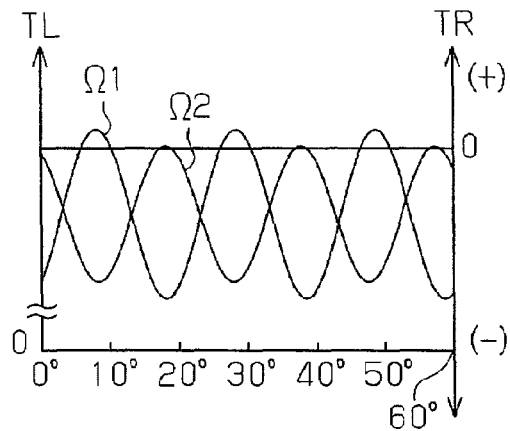
FIG. 14B is a graph of the fundamental order component waveform of the magnetic torque and the fundamental order component waveform of the reluctance torque when using the second comparative rotor 25 of FIG. 18 to show the torque ripple of the curve Q2rm of FIG. 12C.

A curve Ω1 in the graph of FIG. 14B represents the waveform of the component of the fundamental order (18th order) in the magnetic torque when using the second comparative rotor 25 having the arcuate convex portions 26 as shown in FIG. 18. A curve Ω2 represents the waveform of the component of the fundamental order (18th order) in the reluctance torque when using the second comparative rotor 25. The curve Ω1 is on the coordinates indicated by the abscissa axis (rotating position) and the ordinate axis TL (magnitude of torque) on the left side. The curve Ω2 is on the coordinates indicated by the abscissa axis (rotating position) and the ordinate axis TR (magnitude of torque) on the right side.

The above reasons <1>, <2>, that is, features <1>, <2> become apparent by comparing the curves π1, π2 of FIG. 14A when the first comparative rotor 15A is used, and the curves Ω1, Ω2 of FIG. 14B when the second comparative rotor 25 is used.

As shown in FIG. 12A, the curve Qr12 of the synthesized reluctance torque when the first comparative rotor 15A is used has the features <1> and <2>. Thus, by synthesizing the waveform Qr12 of the synthesized reluctance torque and the curve Qm1 of the magnetic torque shown in FIG. 12B, the fundamental order (18th order) component is cancelled out, leaving the 36th order component, thereby significantly achieving a higher order.

As shown by the above features <1> and <2>, when synthesizing the curve Qr22 (shown in FIG. 12A) of the synthesized reluctance torque when the second comparative rotor 25 is used and the curve Qm2 of the magnetic torque shown in FIG. 12B, the cancellation degree of the fundamental order (18th order) component is small. As a result, the torque ripple of the curve Q2rm is larger than that of the curve Q1rm.

The above reason <1> will now be described in detail.

When the second comparative rotor 25 is used, the change in the air gap is smooth as shown in FIG. 13B. In the second comparative rotor 25, the arcuate convex portions 26 having an outwardly convex arc configure portions between the first permanent magnets 17A and the second permanent magnets 17B, that is, inter-pole portions. Therefore, the reluctance torque fluctuation when the second comparative rotor 25 is used is smooth and small. The rotating 18th order component, which underlies the wavelength, is generally small with respect to the amplitude of the component waveform of the rotating fundamental order (18th order) of the magnetic torque waveform.

As shown in FIG. 17, since the first comparative rotor 15A includes the angle portions H11, H12, the first air gap gh1 when using the first comparative rotor 15A is as shown in FIG. 13A. Such change in the air gap emphasizes the 18th order component and the 36th order component of the synthesized reluctance torque when using the first comparative rotor 15A.

Figure 15A:
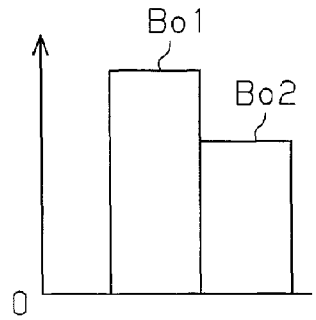
FIG. 15A is a graph obtained by performing Fourier series expansion of the curve Q1rm of FIG. 12C to show the torque ripple of the curve Q1rm.
Figure 15B:
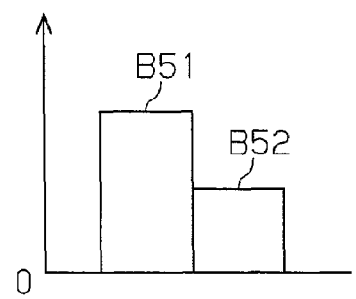
FIG. 15B is a graph obtained by performing Fourier series expansion of the curve Q2rm of FIG. 12C to show the torque ripple of the curve Q2rm.

The bar graph of FIG. 15A shows the result of the Fourier series expansion of the curve Qr12. A bar Bo1 represents the magnitude of the 18th order component obtained by performing Fourier series expansion on the curve Qr12. A bar Bo2 represents the magnitude of the 36th order component obtained by performing Fourier series expansion on the curve Qr12. The bar graph of FIG. 15B shows the result of the Fourier series expansion of the curve Qr22. A bar B51 represents the magnitude of the 18th order component obtained by performing Fourier series expansion of the curve Qr22. A bar B52 represents the magnitude of the 36th order component obtained by performing Fourier series expansion of the curve Qr22.

As apparent from FIGS. 15A and 15B, the 18th order component (Bo1) in the curve Qr12 is greater than the 18th order component (B51) in the curve Qr22. The 36th order component (Bo2) in the curve Qr12 is greater than the 36th order component (B52) in the curve Qr22. The result advantageously acts for the reason <1>. That is, in the curve Q1rm, the amplitude of the component of the fundamental order (18th order) in the reluctance torque is easily equalized with the amplitude of the component of the fundamental order (18th order) in the magnetic torque.

The above reason <2> will now be described in detail.

The phase of the waveform of the 18th order component in the reluctance torque is adjustable by the position where the raised part Qro12 is produced. For example, a waveform π6 of FIG. 16D and a waveform π7 of FIG. 16E will be considered. The waveform π6 is a model waveform, which is generated by adding a waveform π4 of FIG. 16B to a sinusoidal wave π3 of FIG. 16A. The waveform π7 is a model waveform, which is generated by adding a waveform π5 of FIG. 16C to the sinusoidal wave π3 of FIG. 16A. The waveform π6 of FIG. 16D and the waveform π7 of FIG. 16E have a raised part Qro produced at different positions in the identical sinusoidal wave π3.

Figure 16A:
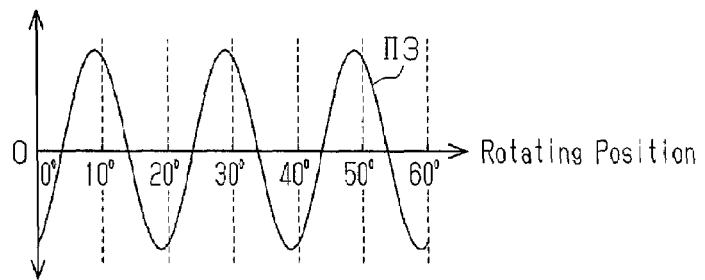
FIG. 16A is a graph showing sinusoidal wave.
Figure 16B:
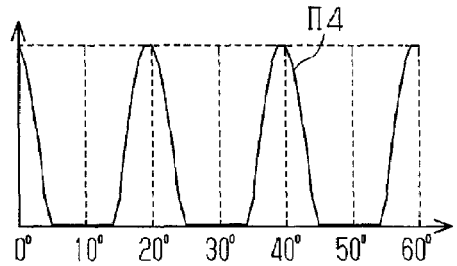
FIG. 16B is a graph showing a first addition waveform.
Figure 16C:
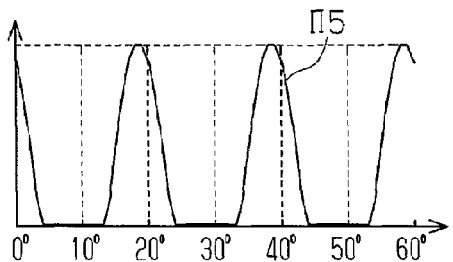
FIG. 16C is a graph showing a second addition waveform.
Figure 16D:
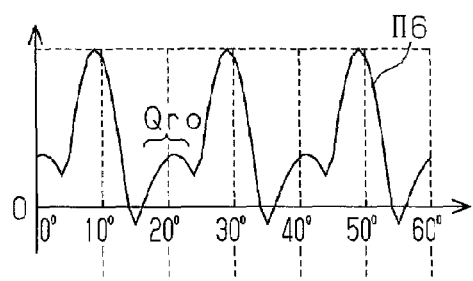
FIG. 16D is a graph showing a first model waveform representing the sum of the waveform of FIG. 16A and the waveform of FIG. 16B.
Figure 16E:
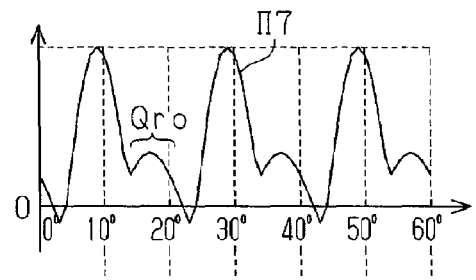
FIG. 16E is a graph showing a second model waveform representing the sum of the waveform of FIG. 16A and the waveform of FIG. 16C.
Figure 16F:
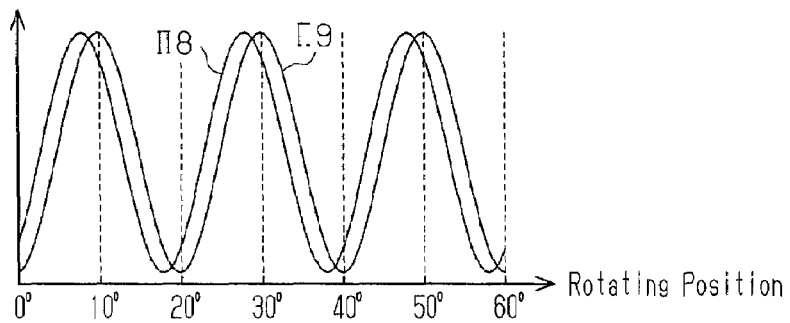
FIG. 16F is a graph showing the 18th order component waveform of the waveform of FIG. 16D and the 18th order component waveform of the waveform of FIG. 16E to explain the difference between the torque ripple of the curve Q1rm and the torque ripple of the curve Q2rm in FIG. 12C.

A waveform π8 of FIG. 16F is the 18th order component waveform extracted from the waveform π6 of FIG. 16D. A waveform π9 of FIG. 16F is the 18th order component waveform extracted from the waveform π7 of FIG. 16E. As apparent from FIG. 16F, the phase of the 18th order component waveform π8 differs from the phase of the 18th order component waveform π9. That is, the phases of the 18th order component waveforms π8, π9 are adjusted by changing the position of the raised part Qro. That is, by appropriately setting the positions of the angle portions H11, H12, the 18th order component of the reluctance torque is adjusted to the antiphase of the 18th order component of the magnetic torque.

The 18th order component and the 36th order component cannot be emphasized in the second comparative rotor 25 in which the angle portions H11, H12 are not formed. Furthermore, the phase of the 18th order component of the reluctance torque cannot be adjusted in the second comparative rotor 25. That is, unlike the first comparative rotor 15A, a significant higher order cannot be achieved in the second comparative rotor 25.

The following is obvious from the above description. Like the first comparative rotor 15A, the rotor 15 can emphasize the 18th order component and the 36th order component of the reluctance torque, and adjust the phase of the 18th order component of the reluctance torque. This is because the rotor 15 includes, like the first comparative rotor 15A, the first angle portions H11, the second angle portions H12, the first magnetic flux blocking bores 21, the second magnetic flux blocking bores 22, and the third magnetic flux blocking bores 23.

The first embodiment has the following advantages.

(1) The rotor 15 includes the convex portions 20 each including the angle portions H11, H12. The second comparative rotor 25 includes the arcuate convex portions 26. The rotor 15 and the second comparative rotor 25 both achieve a higher order of the output torque waveform by synthesizing the magnetic torque and the synthesized reluctance torque. However, effect of reducing the torque ripple by achieving higher order of the output torque is greater for the rotor 15 including the convex portions 20 than for the second comparative rotor 25 including the arcuate convex portions 26.

That is, when Fourier series expansion is performed on the output torque, that is, the total torque, the torque ripple in the fundamental order component of the output torque when using the rotor 15 including the convex portion 20 is smaller than that when using the second comparative rotor 25 including the arcuate convex portions 26. That is, each convex portion 20 including the two angle portions H11, H12 contributes to smoothing the magnetic flux fluctuation at the outer circumferential surface of the rotor 15 and suppresses the torque ripple.

(2) The rotor 15 includes the first magnetic flux blocking bores 21, the second magnetic flux blocking bores 22, and the third magnetic flux blocking bores 23. Therefore, the torque ripple in the order component double the fundamental order of the output torque, that is, the total torque when using the rotor 15 is smaller than, for example, the torque ripple when using the first comparative rotor 15A without magnetic flux blocking bores.

(3) Each first magnetic flux blocking bore 21 is arranged so as to partially overlap a position retarded from the bisector 154 (154A) by 8.5° with respect to the rotation direction Y. As a result, when the rotor 15 is used, the torque ripple in the order component (36th order component) double the fundamental order (18th order) of the total torque is reliably suppressed.

(4) Each first magnetic flux blocking bore 21 is arranged so as to partially overlap a position retarded from the bisector 154 (154A) by 8.5° with respect to the rotation direction Y. Furthermore, each second magnetic flux blocking bore 22 is arranged so as to partially overlap a position retarded from the bisector 154 (154A) by 15.6° with respect to the rotation direction Y. Furthermore, each third magnetic flux blocking bore 23 is arranged so as to partially overlap a position retarded from the bisector 154 (154A) by 20° with respect to the rotation direction Y. As a result, when the rotor 15 is used, the torque ripple in the order component (36th order component) double the fundamental order (18th order) of the total torque is reliably suppressed.

(5) As shown in FIG. 6, among the three straight lines H1, H2, H3 of a single convex portion 20, the lengths of the straight lines H2, H3 on both ends are longer than the extension lines H21, H31, respectively. Such configuration creates change in the first air gap gh1 as shown by the curve Gh1 in FIG. 13A. The configuration in which the straight lines H2, H3 are longer than the extension lines H21, H31, respectively, is advantageous in achieving the higher order of the output torque to reduce the torque ripple in the fundamental order component of the output torque when using the rotor 15.

(6) The winding method of the stator 11 is the wave winding of three phases. Therefore, the stator 11 is advantageous in suppressing vibration of the rotating electric machine.

(7) The distance between the outer circumference of the rotor 15 and the magnetic flux blocking bores 21, 22, 23 is greater than or equal to the thickness of one core plate 18. Therefore, even if the rotor 15 has the magnetic flux blocking bores 21, 22, 23, required strength is easily secured at part of the core plates 18 between the outer circumference of the rotor 15 and the magnetic flux blocking bores 21, 22, 23.

With reference to FIGS. 19 to 22, the appropriate value of the angular position of the first magnetic flux blocking bores 21 and the appropriate value of the angular width of the first magnetic flux blocking bores 21 are explained. Hereinafter, the same reference numerals are given to those components that are the same as the corresponding components of the first embodiment.

Figure 19:
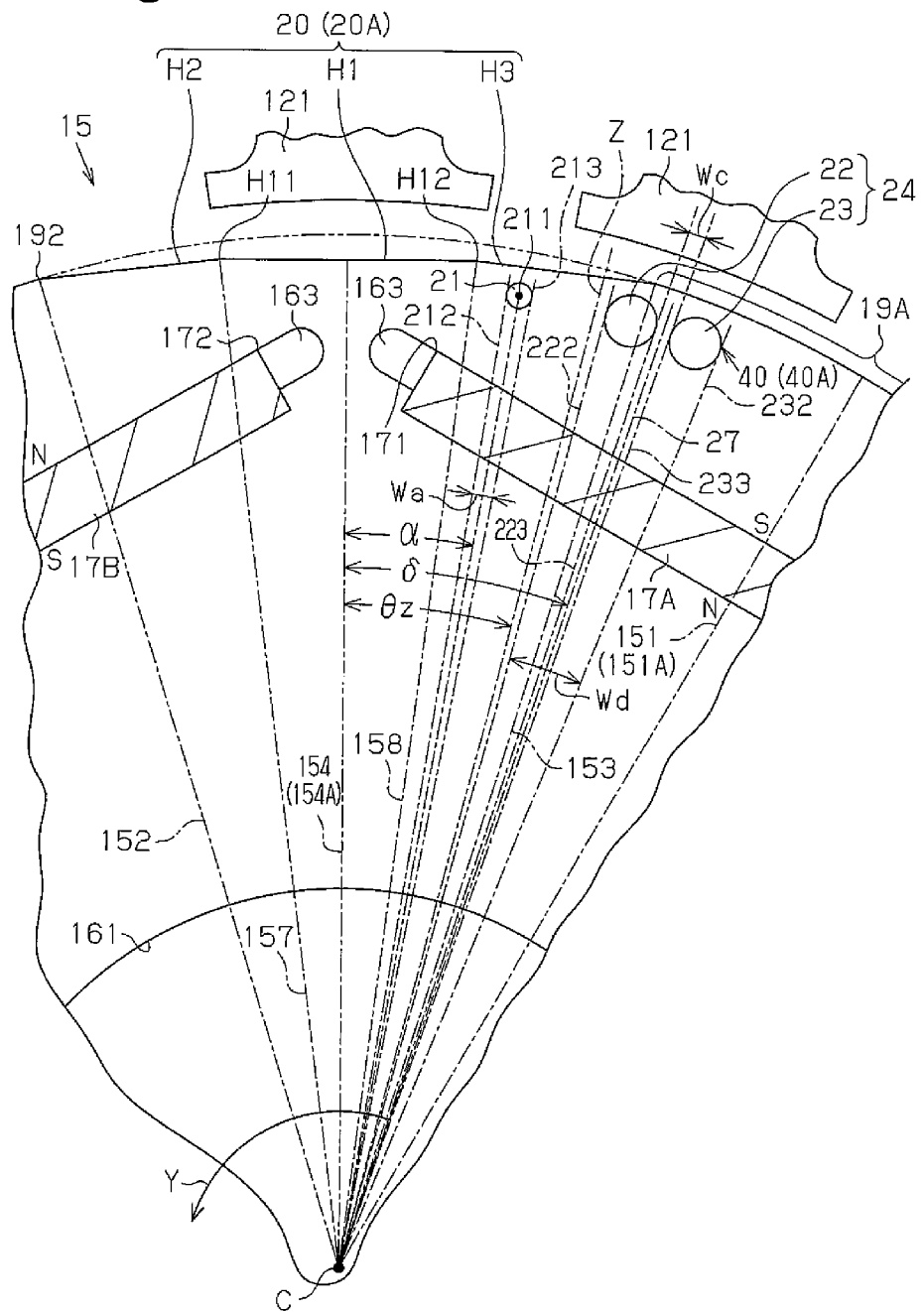
FIG. 19 is a partial cross-sectional view illustrating the rotor 15 of FIG. 1A.

As shown in FIG. 19, the angular position of each first magnetic flux blocking bore 21 is represented by an angle α from the associated bisector 154 (154A) to the center 211 of the first magnetic flux blocking bore 21 in the opposite direction of the rotation direction Y. The bisector 154 (154A) serves as a reference line. Hereinafter, the angular position of the first magnetic flux blocking bore 21 is referred to as a first angular position α. The angular width of the first magnetic flux blocking bore 21 is represented by an angle Wa formed between a pair of tangents 212, 213, which extend through the rotational center C and contact the rim of the first magnetic flux blocking bore 21. Hereinafter, the angular width of the first magnetic flux blocking bore 21 is referred to as a first angular width Wa. In other words, the angular position of the magnetic flux blocking region closer to the bisector, that is, the angular position of the first magnetic flux blocking bore 21 is represented by the angular position of the center of the first angular width Wa, that is, the angular position of the center 211.

FIG. 19 shows a first outer tangent 222 and a second outer tangent 232, which sandwich the second magnetic flux blocking bore 22 and the third magnetic flux blocking bore 23. The first outer tangent 222 extends through the rotational center C and contacts the rim of the second magnetic flux blocking bore 22. The second outer tangent 232 extends through the rotational center C and contacts the rim of the third magnetic flux blocking bore 23. The angle Wd between the first outer tangent 222 and the second outer tangent 232 represents the angular width of the second magnetic flux blocking region 24, that is, a fourth angular width Wd.

Furthermore, FIG. 19 shows a first inner tangent 223 and a second inner tangent 233, which are located between the second magnetic flux blocking bore 22 and the third magnetic flux blocking bore 23. The first inner tangent 223 extends through the rotational center C and contacts the rim of the second magnetic flux blocking bore 22. The second inner tangent 233 extends through the rotational center C and contacts the rim of the third magnetic flux blocking bore 23. The angle Wc between the first inner tangent 223 and the second inner tangent 233 represents the angular spacing between the second magnetic flux blocking bore 22 and the third magnetic flux blocking bore 23, that is, a third angular width Wc.

A middle line 27 extends through the rotational center C and bisects the fourth angular width Wd. The angular position of the middle line 27 is represented by an angle δ. The angle δ extends from the bisector 154 (154A), which serves as the reference line, in the opposite direction of the rotation direction Y to the middle line 27. Hereinafter, the angle δ is referred to as the angular position of the middle line 27, that is, a second angular position δ. In other words, the angular position of the magnetic flux blocking region closer to the radial line (151A), that is, the angular position of the second magnetic flux blocking region 24 is represented by the angular position of the center of the fourth angular width Wd, that is, the second angular position δ.

FIG. 19 shows a virtual straight line Z, which extends from the rotational center C to the outer circumference of the rotor 15. The first angular position α of the first magnetic flux blocking bore 21 is located in a region between the virtual straight line Z and the bisector 154 (154A). The second angular position δ of the second magnetic flux blocking region 24 is located in a region between the virtual straight line Z and the radial line 151 (151A).

Figure 20A:
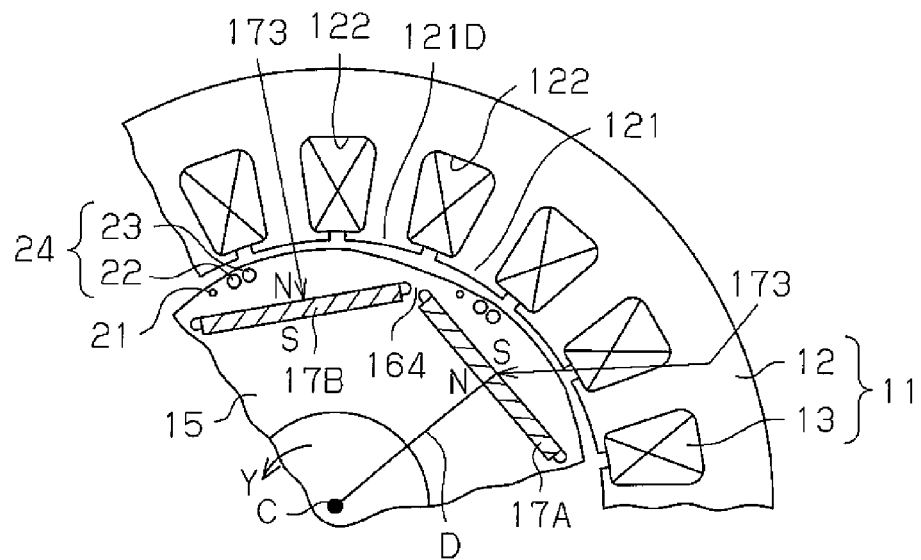
FIG. 20A is a partial cross-sectional view illustrating the stator and the rotor of FIG. 1A.
Figure 20B:
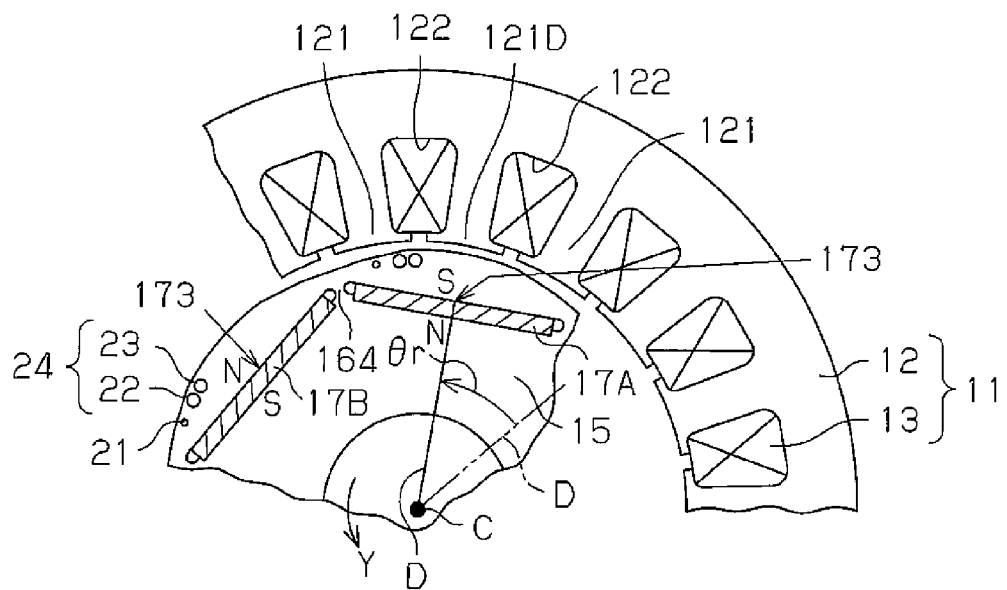
FIG. 20B is a partial cross-sectional view illustrating the rotor rotated with respect to the stator of FIG. 20A.

As shown in FIG. 20A, when the rotor 15 rotates in the rotation direction Y, and a tooth 121D approaches one of the magnetic pole switching parts 164, the tooth torque acting on the tooth 121D starts to rise. Furthermore, when the circumferential center of the tooth 121D approaches the magnetic pole center 173 of the first permanent magnet 17A as shown in FIG. 20B as the rotor 15 rotates, the tooth torque acting on the tooth 121D approaches zero.

The angular width of a pair of adjacent magnetic pole switching parts 164 is (360°/p). p represents the number of the magnetic poles. The angular width of the pitch of the slots 122 is (360°/K). K represents the number of the slots. The rotational angle θr of the rotor 15 from when the tooth torque rises until the tooth torque becomes zero is approximately represented by the sum of half the angular width between the adjacent magnetic pole switching parts 164 and half the angular width of the pitch of the slots 122. FIG. 20B shows the rotational angle θr. The rotational angle θr of the rotor 15 from when the tooth torque rises until it becomes zero is approximately represented by the following expression (7). The straight line D shown in FIGS. 20A and 20B connects the rotational center C to the magnetic pole center 173. The straight line D shown by an imaginary line in FIG. 20B represents the same position as the straight line D shown by a solid line in FIG. 20A. The rotational angle θr represents the rotational angle of the straight line D when the rotor 15 is rotated from the state shown in FIG. 20A to the state shown in FIG. 20B.

$$\theta r=(360°/p)/2+(360°/K)/2 \quad (7)$$

In the first embodiment, the number of poles p=6. The number of slots K=18. θr is 40°. The fundamental order (18) of the output torque is the least common multiple of the number of poles p (=6) and the number of slots K (=18).

As shown in FIG. 19, the angular position of the tangents 212, 213, which contact the first magnetic flux blocking bore 21, is located toward the rotation direction Y from the angular position of the virtual straight line Z. The first outer tangent 222 and the second outer tangent 232, which contact the second magnetic flux blocking region 24, are located toward the opposite direction of the rotation direction Y from the angular position of the virtual straight line Z. The first magnetic flux blocking bore 21 is the first magnetic flux blocking region set in a region between the virtual straight line Z and the bisector 154 (154A). The second magnetic flux blocking region 24 is a second magnetic flux blocking region set in a region between the virtual straight line Z and the radial line 151 (151A). The virtual straight line Z is set at a position rotated from the bisector 154 (154A) in a direction opposite to the rotation direction Y (shown in FIG. 19) by an angle θz, which is three eighths of the rotational angle θr=[(360°/p)/2+(360°/K)/2].

In this manner, when the fundamental order of the output torque is set to the least common multiple of the number of poles p and the number of slots K in the permanent magnet embedment rotating electric machine, the first angular position α of the first magnetic flux blocking region (21) is set in a region between the virtual straight line Z and the bisector 154 (154A). Furthermore, the second angular position δ of the second magnetic flux blocking region 24 is set in a region between the virtual straight line Z and the radial line 151 (151A). The first magnetic flux blocking region (21) functions as a measure for suppressing the torque ripple in the order component double the fundamental order of the output torque. The second magnetic flux blocking region 24 functions as a measure for suppressing the torque ripple in the fundamental order component of the output torque.

The above description is summarized as follows. As long as the first angular position α of the first magnetic flux blocking region (21) is located in the region between the virtual straight line Z and the bisector 154 (154A), the first magnetic flux blocking region (21) may overlap the virtual straight line Z. As long as the second angular position δ of the second magnetic flux blocking region 24 is located in the region between the virtual straight line Z and the radial line 151 (151A), the second magnetic flux blocking region 24 may overlap the virtual straight line Z.

That is, on the assumption that the first angular position α of the first magnetic flux blocking region (21) is located in the region between the virtual straight line Z and the bisector 154 (154A), the first magnetic flux blocking region (21) may protrude from the virtual straight line Z toward the radial line 151 (151A). On the assumption that the second angular position δ of the second magnetic flux blocking region 24 is located in the region between the virtual straight line Z and the radial line 151 (151A), the second magnetic flux blocking region 24 may protrude from the virtual straight line Z toward the bisector 154 (154A).

Thus, the first magnetic flux blocking region (21) may be set at any position as long as it is set in the region between the virtual straight line Z and the bisector 154 (154A), or in the region overlapping the virtual straight line Z. The angular position (α) of the first magnetic flux blocking region (21) may be set in the region between the virtual straight line Z and the bisector 154 (154A). The second magnetic flux blocking region 24 may be set at any position as long as it is set in the region between the virtual straight line Z and the radial line 151 (151A), or in the region overlapping the virtual straight line Z. The angular position (δ) of the second magnetic flux blocking region 24 may be set in the region between the virtual straight line Z and the radial line 151 (151A).

Figure 21:
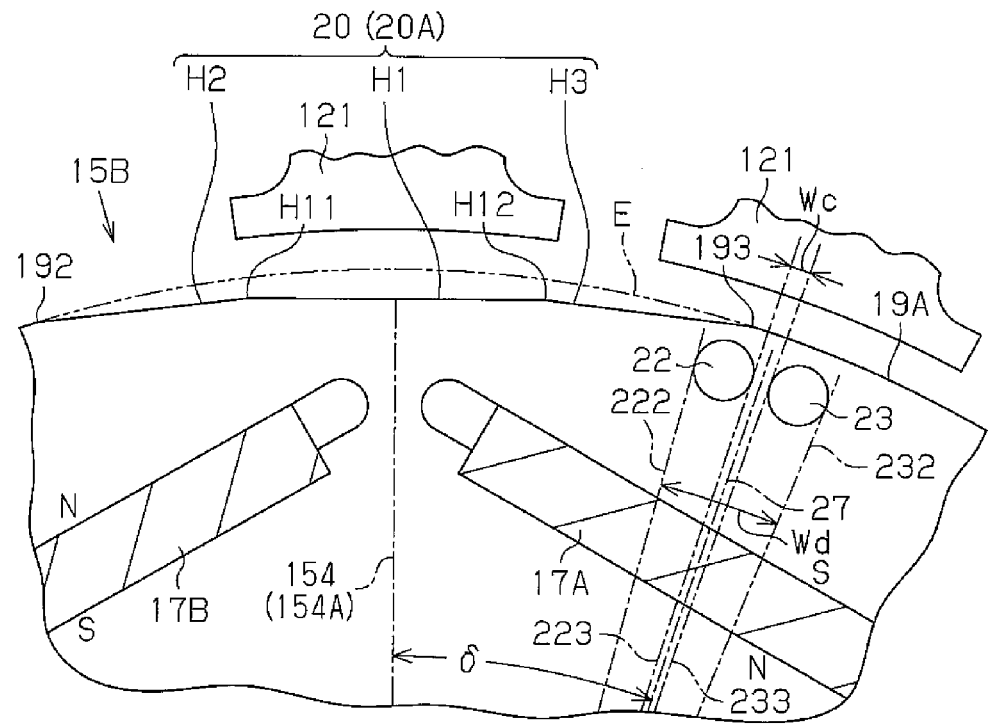
FIG. 21 is a partial cross-sectional view illustrating a second rotor 15B of the present invention.
Figure 22:
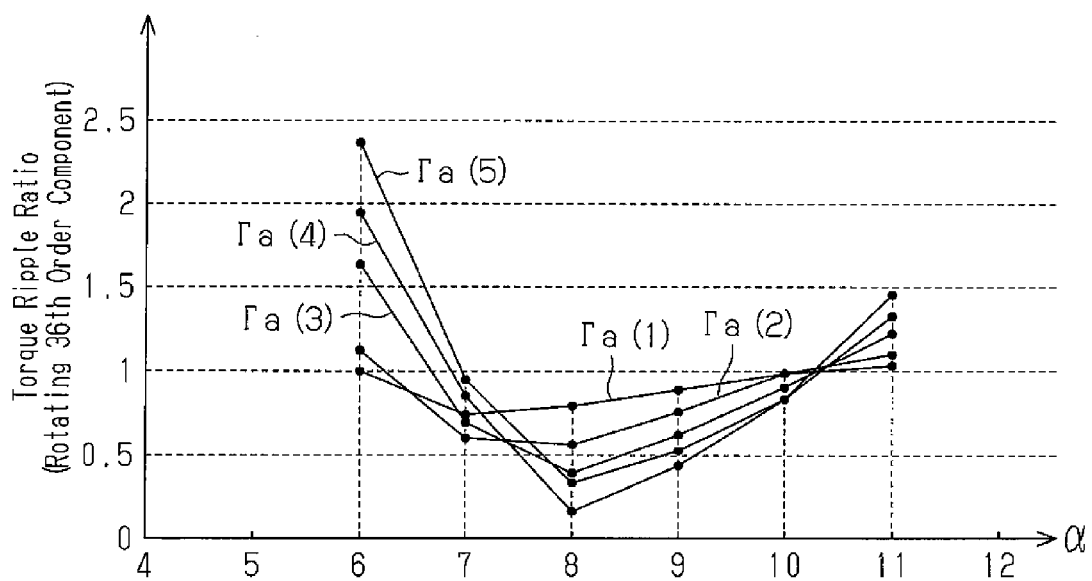
FIG. 22 is a graph showing an appropriate value of the first angular width Wa and an appropriate value of the first angular position a for the first magnetic flux blocking region of the rotor 15 of FIG. 19.

The graph of FIG. 22 shows an example of FEM analysis of changes in the torque ripple ratio in a case where the first angular width Wa and the first angular position α are varied when using the rotor 15, which includes the first magnetic flux blocking bores 21, the second magnetic flux blocking bores 22, and the third magnetic flux blocking bores 23. The abscissa axis in the graph of FIG. 22 represents values of the first angular position α. The ordinate axis represents values of the torque ripple ratio. The black dots in the graph represent actual data obtained through FEM analysis. The torque ripple ratio=1 shows a case in which the torque ripple obtained through FEM analysis of a second rotor 15B shown in FIG. 21 is one. As shown in FIG. 21, the second rotor 15B does not have the first magnetic flux blocking bores 21, and has only the second magnetic flux blocking bores 22 and the third magnetic flux blocking bores 23.

In the graph of FIG. 22, the common first analysis conditions J1 are as follows: the radius R=25.5 mm, the angular width A=27°, the angular width θc=12°, the depth Dh=0.45 mm, the second angular position δ=19°, the fourth angular width Wd=4°, and the third angular width Wc=1°.

The group of actual data Γa(1), Γa(2), Γa(3), Γa(4), Γa(5) in the graph of FIG. 22 represents data obtained when the first angular width Wa is set to 0.4°, 0.9°, 1.4°, 1.9°, 2.4°, respectively. That is, the first angular width Wa is incremented from 0.4° by 0.5°.

According to the result of the analysis in FIG. 22, when the first angular position α satisfies the following expression (1-1) and the first angular width Wa satisfies the following expression (2-1), the torque ripple ratio in the 36th component, which is double the fundamental order (18th order), is suppressed to one or less.

$$7° \leq \alpha \leq 10° \quad (1\text{-}1)$$

$$Wa \leq 2.4° \quad (2\text{-}1)$$

The expressions (1-1), (2-1) correspond to a case where the number of poles p=6. To correspond to cases where the number of poles p is not six, the expressions (1-1), (2-1) are expanded to the following expressions (1), (2).

$$7° \times 6/p \leq \alpha \leq 10° \times 6/p \quad (1)$$

$$Wa \leq 2.4° \times 6/p \quad (2)$$

The appropriate value of a second angular width Wb of the second magnetic flux blocking region 24, and the appropriate value of the second angular position δ will now be described with reference to FIGS. 23 to 25.

Figure 23:
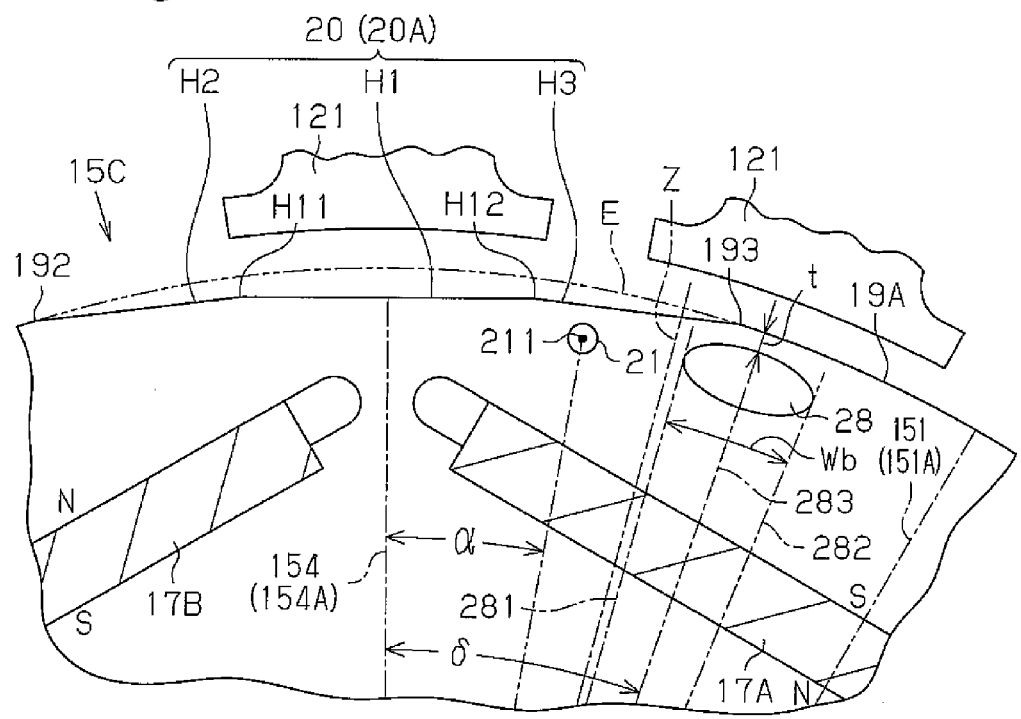
FIG. 23 is a partial cross-sectional view illustrating a third rotor 15C of the present invention.
Figure 24:
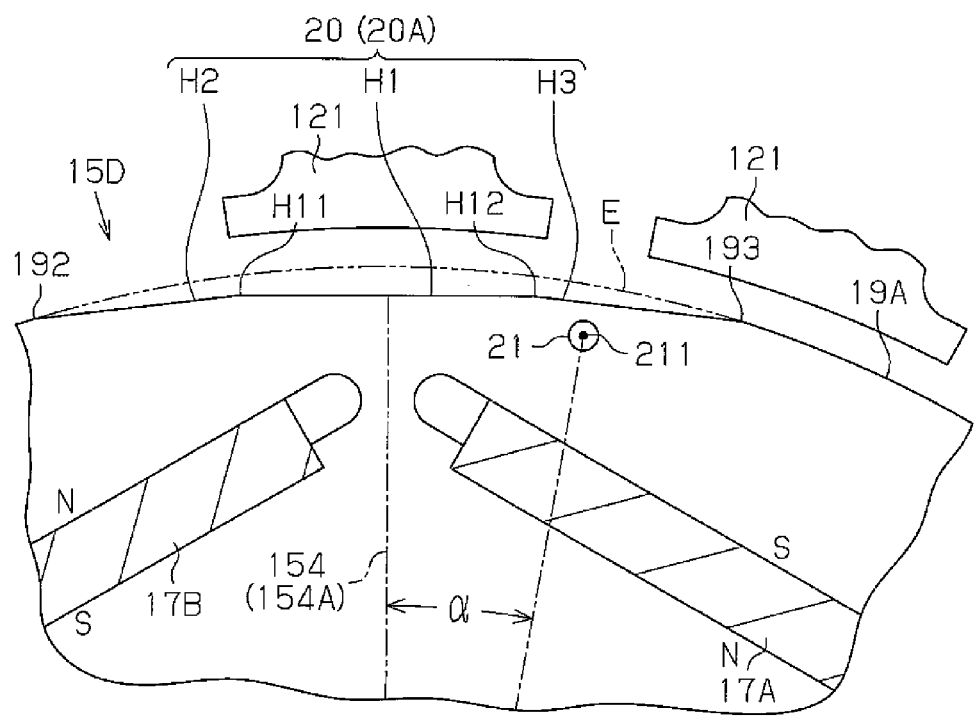
FIG. 24 is a partial cross-sectional view illustrating a fourth rotor 15D of the present invention.

FIG. 23 shows a third rotor 15C, which includes six first magnetic flux blocking bores 21 and six elliptical elongated magnetic flux blocking bores 28. That is, the third rotor 15C includes six simple magnetic flux blocking regions. Each elongated magnetic flux blocking bore 28 defines one of the second magnetic flux blocking regions of the third rotor 15C. That is, each elongated magnetic flux blocking bore 28 is located at a position apart from the first magnetic flux blocking bore 21 in a direction opposite to the rotation direction Y of the third rotor 15C. FIG. 23 shows a pair of tangents 281, 282, which extend through the rotational center C and contact the outer circumference of the elongated magnetic flux blocking bore 28. The angle Wb between the tangents 281, 282 represents the angular width of the elongated magnetic flux blocking bore 28. A middle line 283, which extends through the rotational center C, bisects the second angular width Wb. The angular position of the middle line 283 is represented by the second angular position δ. The second angular position δ extends from the bisector 154 (154A) in a direction opposite to the rotation direction Y to the middle line 283. The second angular position δ represents the angular position of the center of the second angular width Wb. That is, the second angular position δ represents the angular position of the elongated magnetic flux blocking bore 28.

In the third rotor 15C, the first angular position α of the first magnetic flux blocking bore 21, which defines a magnetic flux region closer to the bisector, is located in a region between the virtual straight line Z and the bisector 154 (154A). The second angular position δ of the elongated magnetic flux blocking bore 28, which defines a magnetic flux region closer to the radial line, is located in a region between the virtual straight line Z and the radial line 151 (151A).

Figure 25:
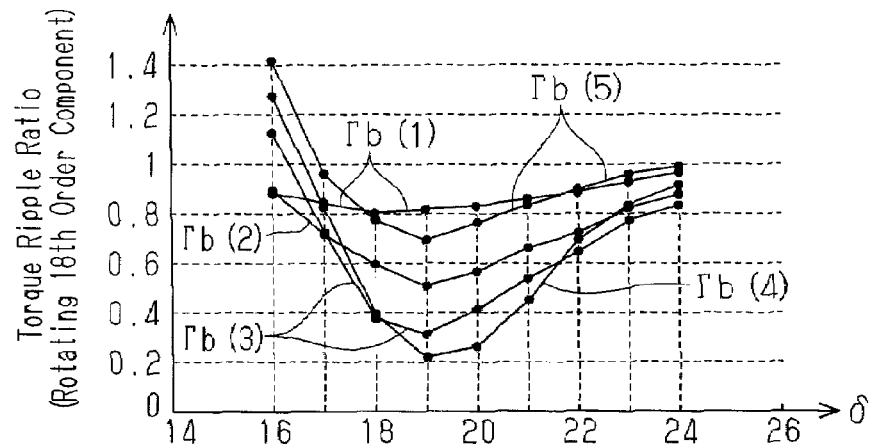
FIG. 25 is a graph showing an appropriate value of the second angular width Wb and an appropriate value of the second angular position δ for the second magnetic-flux blocking region when using the fourth rotor 15D of FIG. 24.

The graph of FIG. 25 shows an example of FEM analysis of changes in the torque ripple ratio in a case where the second angular width Wb and the second angular position δ are varied when using the third rotor 15C, which includes the first magnetic flux blocking bores 21 and the elongated magnetic flux blocking bores 28. The abscissa axis of FIG. 25 represents values of the second angular position δ and the ordinate axis represents values of the torque ripple ratio. The black dots in the graph represent the actual data obtained through FEM analysis. FIG. 24 shows a fourth rotor 15D to be compared with the third rotor 15C. The fourth rotor 15D does not include the elongated magnetic flux blocking bores 28, and includes only the first magnetic flux blocking bores 21. The torque ripple ratio=1 shown in FIG. 25 represents a case where the torque ripple in an example of FEM analysis is set to one when the fourth rotor 15D shown in FIG. 24 is used.

The common second analysis conditions J2 in the graph of FIG. 25 are as follows: the radius R=25.5 mm, the angular width A=27°, the angular width θc=12°, the depth Dh=0.45 mm, the first angular position α=8°, and the first angular width Wa=1.4°.

The group of actual data Γb(1), Γb(2), Γb(3), Γb(4), Γb(5) in the graph of FIG. 25 represents data obtained when the second angular width Wb is set to 3.3°, 4.3°, 5.3°, 6.3°, 7.3°, respectively. That is, the second angular width Wb is incremented from 3.3° by 1.0°.

According to the result of the analysis in FIG. 25, when the second angular position δ satisfies the following expression (3-1) and the second angular width Wb satisfies the following expression (4-1), the torque ripple ratio in the fundamental order (18th order) component is suppressed to one or less.

$$17° \leq \delta \leq 24° \quad (3\text{-}1)$$

$$Wb \leq 7.3° \quad (4\text{-}1)$$

The expressions (3-1), (4-1) correspond to a case where the number of poles p=6. To correspond to cases where the number of poles p is not six, the expressions (3-1), (4-1) are expanded to the following expressions (3), (4).

$$17° \times 6/p \leq \delta \leq 24° \times 6/p \quad (3)$$

$$Wb \leq 7.3° \times 6/p \quad (4)$$

The appropriate value of the fourth angular width Wd in a case where the second magnetic flux blocking region 24 is configured by a pair of magnetic flux blocking bores 22, 23 as the rotor 15 shown in FIG. 19 will now be described with reference to FIG. 26.

Figure 26:
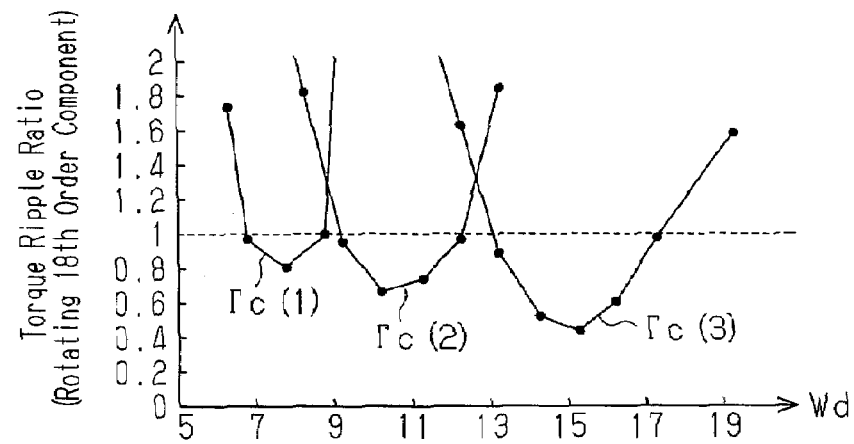
FIG. 26 is a graph showing an appropriate value of the fourth angular width Wd when using the rotor 15 of FIG. 19.

The graph of FIG. 26 shows an example of FEM analysis of changes in the torque ripple ratio in a case where the fourth angular width Wd and the third angular width Wc are varied when using the rotor 15, which includes the first magnetic flux blocking bores 21, the second magnetic flux blocking bores 22, and the third magnetic flux blocking bores 23. The abscissa axis of FIG. 26 represents values of the fourth angular width Wd and the ordinate axis represents values of the torque ripple ratio. The black dots in the graph represent the actual data obtained through FEM analysis. The torque ripple ratio=1 shows a case where the torque ripple is set to one when the third angular width Wc=0°. The common third analysis conditions J3 in the graph of FIG. 26 are as follows: the radius R=25.5 mm, the angular width A=27°, the angular width θc=12°, the depth Dh=0.45 mm, the first angular position α=8°, the second angular position δ=19°, the first angular width Wa=1.4°, and the second angular width Wb=6.3°.

The group of actual data Γc(1), Γc(2), Γc(3) in the graph of FIG. 26 represents data obtained when the third angular width Wc is set to 1°, 2°, 3°, respectively. That is, the third angular width Wc is incremented from 1° by 1°.

According to the result of the analysis in FIG. 26, when the fourth angular width Wd satisfies the following expression (5), the torque ripple ratio in the fundamental order (18th order) component is suppressed to one or less.

$$Wb+0.75 \times (Wc^2+Wc)-(0.5 \times Wc+0.5) \leq Wd \leq Wb+0.75 \times (Wc^2+Wc)+(0.5 \times Wc+0.5) \quad (5)$$

The second angular width Wb in the expression (5) is based on the assumption that the expressions (3) and (4) are satisfied. Based on the second angular width Wb, the fourth angular width Wd is obtained by the expression (5). The second magnetic flux blocking region 24 corresponding to the fourth angular width Wd in the expression (5) suppresses the torque ripple in the fundamental order (18th order) component to be less than or equal to that of, for example, the elongated magnetic flux blocking bores 28 of FIG. 23 corresponding to the second angular width Wb, which is on the assumption that the expressions (3) and (4) are satisfied.

FIG. 23 shows the distance t between each first circumferential portion 19A and the associated elongated magnetic flux blocking bore 28 when the third rotor 15C is used. The distance t shows the shortest distance between the first circumferential portion 19A and the rim of the elongated magnetic flux blocking bore 28.

The appropriate relationship between the distance t and a diameter 2R of the rotor 15 in a case where each second magnetic flux blocking region is a simple magnetic flux blocking region, which is configured by only one elongated magnetic flux blocking bore 28 as shown in FIG. 23, will now be described with reference to FIG. 27.

Figure 27:
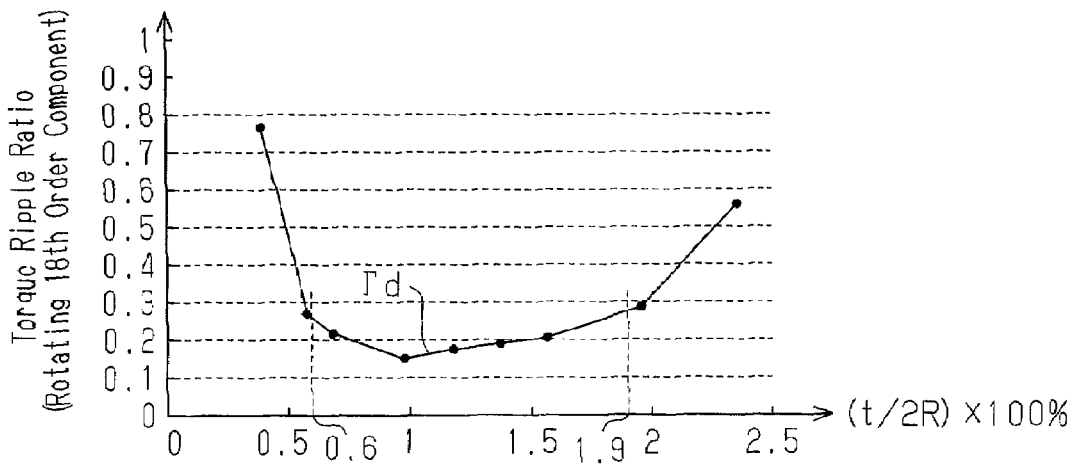
FIG. 27 is a graph showing an appropriate value of the ratio (t/2R)

The graph of FIG. 27 shows an example of the FEM analysis of changes in the torque ripple ratio in a case where the ratio between the distance t and the diameter 2R (t/2R) is changed when using the third rotor 15C, which includes the first magnetic flux blocking bores 21 and the elongated magnetic flux blocking bores 28. The diameter 2R is a constant value. The abscissa axis of FIG. 27 represents values indicating the ratio (t/2R) in percentage, and the ordinate axis represents values of the torque ripple ratio. The black dots in the graph represent the actual data obtained through FEM analysis. The torque ripple ratio=1 represents a case where the torque ripple obtained through FEM analysis is set to one when the elongated magnetic flux blocking bores 28 are not provided as the fourth rotor 15D shown in FIG. 24.

The common fourth analysis conditions J4 for obtaining the graph of FIG. 27 are as follows: the radius R=25.5 mm, the angular width A=27°, the angular width θc=12°, the depth Dh=0.45 mm, the first angular position α=8°, the second angular position δ=19°, the first angular width Wa=1.4°, and the second angular width Wb=6.3°.

According to the result of the analysis shown by the group of actual data Γd in FIG. 27, when the ratio (t/2R) satisfies the following expression (6), effect of reducing the torque ripple ratio in the fundamental order (18th order) component to one fourth or less (=0.25 or less) is sufficiently achieved.

$$0.006 \leq t/2R \leq 0.019 \quad (6)$$

The present invention may be modified as follows.

Figure 28:
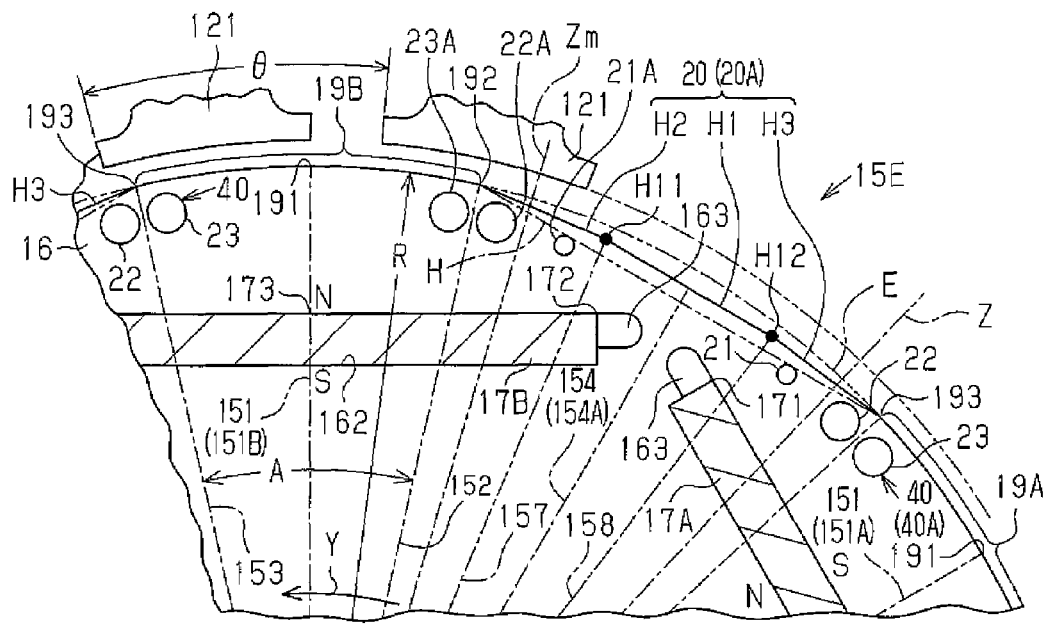
FIG. 28 is a partial cross-sectional view illustrating a fifth rotor 15E of the present invention.

As shown in FIG. 28, a fifth rotor 15E includes auxiliary first magnetic flux blocking bores 21A, auxiliary second magnetic flux blocking bores 22A, and auxiliary third magnetic flux blocking bores 23A. Furthermore, the fifth rotor 15E includes the first magnetic flux blocking bores 21, the second magnetic flux blocking bores 22, and the third magnetic flux blocking bores 23. The auxiliary first magnetic flux blocking bores 21A, the auxiliary second magnetic flux blocking bores 22A, and the auxiliary third magnetic flux blocking bores 23A are located in the vicinity of the second straight lines H2.

In FIG. 28, the radial line 151 extending in the vertical direction in the drawing is referred to as a second representative radial line 151B. The second representative radial line 151B is located in the rotation direction Y from the representative radial line 151A. An auxiliary virtual straight line Zm is arranged so that the auxiliary virtual straight line Zm and the virtual straight line Z have reflection symmetry with respect to the bisector 154 (154A). Each auxiliary first magnetic flux blocking bore 21A configures an auxiliary first magnetic flux blocking region. Each auxiliary second magnetic flux blocking bore 22A and the corresponding auxiliary third magnetic flux blocking bore 23A configure an auxiliary second magnetic flux blocking region.

The angular position of the auxiliary first magnetic flux blocking bore 21A is located in a region between the auxiliary virtual straight line Zm and the bisector 154 (154A). The angular position of the auxiliary second magnetic flux blocking region is located in a region between the auxiliary virtual straight line Zm and the radial line 151 (151B).

Each auxiliary first magnetic flux blocking bore 21A is arranged so that the auxiliary first magnetic flux blocking bore 21A and the associated first magnetic flux blocking bore 21 have reflection symmetry with respect to the bisector 154 (154A). Each auxiliary second magnetic flux blocking bore 22A is arranged so that the auxiliary second magnetic flux blocking bore 22A and the associated second magnetic flux blocking bore 22 have reflection symmetry with respect to the bisector 154 (154A). Each auxiliary third magnetic flux blocking bore 23A is arranged so that the auxiliary third magnetic flux blocking bore 23A and the associated third magnetic flux blocking bore 23 have reflection symmetry with respect to the bisector 154 (154A).

A straight line 157 connects the first angle portion H11 to the rotational center C (see FIG. 1B). Of the two angle portions H11, H12 of the representative convex portion 20 located toward the direction opposite to the rotation direction Y from the second representative radial line 151B, the first angle portion H11 is the one closer to the second representative radial line 151B. The auxiliary first magnetic flux blocking bore 21A, the auxiliary second magnetic flux blocking bore 22A, and the auxiliary third magnetic flux blocking bore 23A are located within a range between the second representative radial line 151B and the straight line 157 located toward the direction opposite to the rotation direction Y from the second representative radial line 151B.

Rotating the fifth rotor 15E in either direction suppresses the torque ripple in the 36th order component of the output torque.

Figure 29:
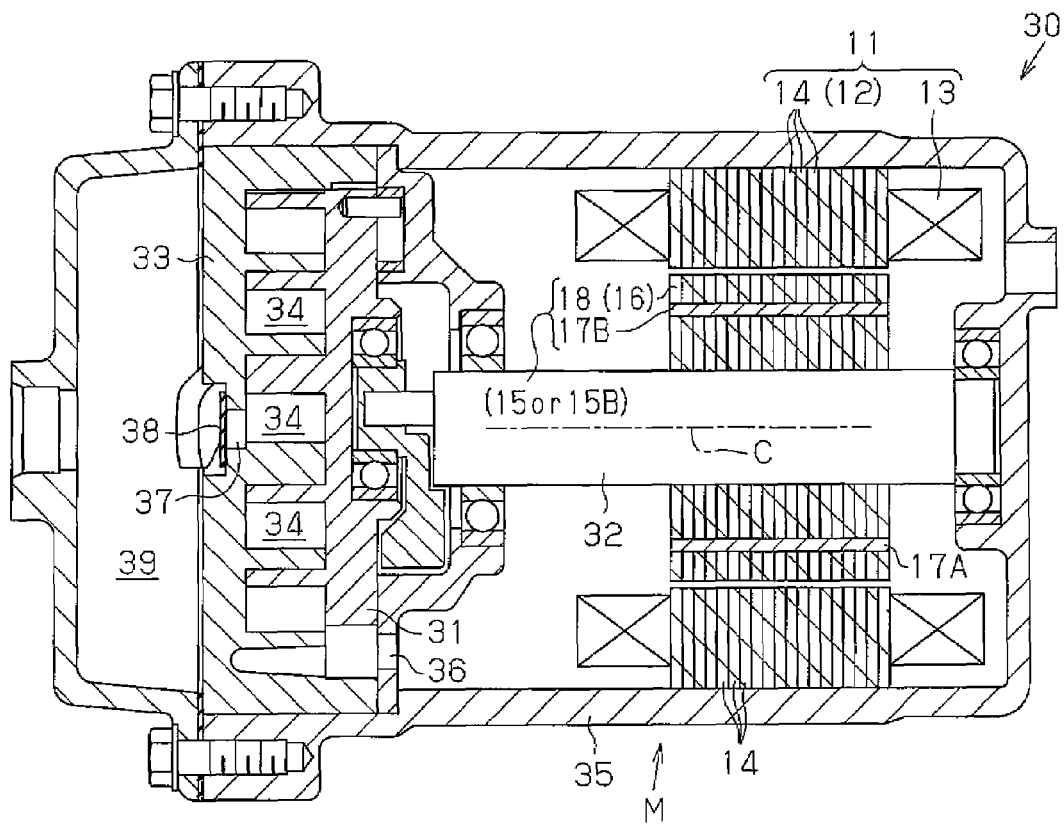
FIG. 29 is a longitudinal cross-sectional view illustrating the compressor in which the rotating electric machine of FIG. 1A is assembled.

As shown in FIG. 29, the present invention may be applied to an enclosed electric compressor 30. The electric compressor 30 is a scroll electric compressor. The rotating electric machine M is used as a car air-conditioner motor. The rotating electric machine M includes a motor housing 35, the stator 11, the rotor 15, and the rotating shaft 32. The stator 11 is secured to the inner circumferential surface of the motor housing 35. The rotating electric machine M may include the fifth rotor 15E instead of the rotor 15. The rotor 15 or the fifth rotor 15E is fixed on the rotating shaft 32.

The electric compressor 30 includes a movable scroll 31 and a fixed scroll 33. The movable scroll 31 functions as a compression operation body. As the rotating shaft 32 rotates, the movable scroll 31 is rotated, thereby compressing refrigerant. That is, the volume of a compression chamber 34, which is defined by the movable scroll 31 and the fixed scroll 33, is reduced. The refrigerant introduced to the motor housing 35 from an external refrigerant circuit (not shown) is drawn into the compression chamber 34 through a suction port 36. The refrigerant in the compression chamber 34 is sent through a discharge port 37, forced out of a discharge valve 38, and discharged into a discharge chamber 39. The refrigerant in the discharge chamber 39 flows into the external refrigerant circuit to flow back into the motor housing 35.

The rotating electric machine M of the present invention is superior in that it has low pulsation, that is, low vibration, and is suitable for application to the enclosed electric compressor 30. The demand for reducing noise and vibration without lowering the average value of the output torque is strong for the vehicle enclosed motor-driven compressor. The permanent magnet embedment rotating electric machine M of the present invention satisfies such demand.

A magnetic flux blocking section may be configured by providing a non-magnetic material in each of the first magnetic flux blocking bores 21, 21A, the second magnetic flux blocking bores 22, 22A, and the third magnetic flux blocking bores 23, 23A.

The invention claimed is:

1. A permanent magnet embedment rotating electric machine, comprising:
an annular stator, the stator defining a radial direction;
a plurality of teeth arranged on an inner circumference of the stator, a slot being defined between each adjacent pair of the teeth;
a plurality of coils, each coil being arranged in the corresponding slots;
a rotor located inside of the stator, the rotor being rotatable in a rotation direction, the rotor defining a rotational axis, a virtual circumference about the rotational axis, and said rotor comprising a rotor core having an outer circumference, wherein the rotor core outer circumference is alternately provided with a plurality of circumferential core portions and a plurality of convex core portions, the circumferential core portions being included in the virtual circumference, each of the circumferential core portions including a circumferential center, the convex core portions being located radially inward of the virtual circumference and bulging radially outward, each convex core portion including first and second angle core portions, and three peripheral core straight lines, wherein said three peripheral core straight lines are connected to one another to define the first and second angle core portions, said rotor further defining first virtual straight lines and second virtual straight lines, wherein each of said first virtual straight lines connecting the rotational axis to one of the circumferential centers of said circumferential core portions being referred to as radial lines, each of said second virtual straight lines bisecting one of the convex core portions being referred to as bisectors;
a plurality of permanent magnets embedded inside the rotor, each of the permanent magnets having a magnetic pole center; and
a plurality of magnetic flux blocking regions located on the rotor core, one of the magnetic flux blocking region being located in a range between the radial line and the bisector adjacent to and preceding the radial line in the rotation direction,
wherein the second angle core portion is closer to the radial line than the first angle core portion,
wherein a straight line, which connects the second angle core portion to the rotational axis, is referred to as an angle straight line, and
wherein the magnetic flux blocking region is located in a range between the radial line and the angle straight line.

2. The rotating electric machine according to claim 1, wherein each of the magnetic flux blocking regions includes a plurality of magnetic flux blocking sections.

3. The rotating electric machine according to claim 1, wherein the permanent magnets define a number of poles p in the rotating electric machine,
wherein the number of the slots is K,
wherein the output torque of the rotating electric machine includes a fundamental order component corresponding to a fundamental order and a double order component corresponding to an order double the fundamental order, the fundamental order being the least common multiple of the number of poles p and the number of slots K,
wherein the magnetic flux blocking region includes a first magnetic flux blocking region closer to the bisector and a second magnetic flux blocking region closer to the radial line, the first magnetic flux blocking region suppressing torque ripple in the double order component, and the second magnetic flux blocking region suppressing torque ripple in the fundamental order component,
wherein the rotor defines a virtual straight line Z, which extends from the rotational axis to the rotor core outer circumference, the virtual straight line Z being located at an angular position rotated in a direction opposite to the rotation direction from the bisector by $[(360°/p)/2+/2] \times 3/8$,
wherein the first magnetic flux blocking region is set in a region between the virtual straight line Z and the bisector or a region partially overlapping the virtual straight line Z, and
wherein the second magnetic flux blocking region is set in a region between the virtual straight line Z and the radial line or a region partially overlapping the virtual straight line Z.

4. The rotating electric machine according to claim 3,
wherein the first magnetic flux blocking region is located at a first angular position α, which is a position rotated from the bisector in the direction opposite to the rotation direction by an angle α,
wherein the first magnetic flux blocking region extends in the circumferential direction by a first angular width Wa about the rotational axis,
wherein the first angular position α and the number of poles p satisfy the following expression (1), and
wherein the first angular width Wa and the number of poles p satisfy the following expression (2), $$7°\times 6/p \leq \alpha \leq 10°\times 6/p \quad (1)$$

$$Wa \leq 2.4°\times 6/p \quad (2).$$

5. The rotating electric machine according to claim 4,
wherein the number of poles p is set to six,
wherein the number of slots K is eighteen,
wherein the first magnetic flux blocking region includes a first magnetic flux blocking section, the first magnetic flux blocking section being located to overlap a position rotated from the bisector in the direction opposite to the rotation direction by an angle 8.5, and wherein, the second angle core portion is closer to the radial line than the first angle core portion, and a straight line connecting the second angle core portion to the rotational axis is referred to as an angle straight line, the angle straight line being located between the first magnetic flux blocking section and the bisector.

6. The rotating electric machine according to claim 3,
wherein the second magnetic flux blocking region is located at a second angular position δ, which is a position rotated from the bisector in the direction opposite to the rotation direction by an angle δ, the second angular position δ and the number of poles p satisfying the following expression (3),
wherein the second magnetic flux blocking region defines a second angular width Wb about the rotational axis, and
wherein the second angular width Wb and the number of poles p satisfy the following expression (4), $$17°\times 6/p \leq \delta \leq 24°\times 6/p \quad (3)$$

$$Wb \leq 7.3°\times 6/p \quad (4).$$

7. The rotating electric machine according to claim 6,
wherein the second magnetic flux blocking region includes a second magnetic flux blocking section and a third magnetic flux blocking section, the second magnetic flux blocking section being separated from the third magnetic flux blocking section.

8. The rotating electric machine according to claim 6,
wherein the second magnetic flux blocking region is one of a simple magnetic flux blocking region formed of a single magnetic flux blocking section and a complex magnetic flux blocking region formed of a second magnetic flux blocking section and a third magnetic flux blocking section,
wherein the simple magnetic flux blocking region extends in the circumferential direction by the second angular width,
wherein an interval between the second magnetic flux blocking section and the third magnetic flux blocking section extends in the circumferential direction by a third angular width Wc about the rotational axis,
wherein the first magnetic flux blocking region extends in the circumferential direction by a fourth angular width Wd about the rotational axis, and
wherein the second angular width Wb, the third angular width Wc, and the fourth angular width Wd satisfy the following expression (5), $$Wb+0.75\times(Wc^2+Wc)-(0.5\times Wc+0.5)\leq Wd\leq Wb+0.75\times(Wc^2+Wc)+(0.5\times Wc+0.5) \quad (5).$$

9. The rotating electric machine according to claim 7,
wherein the second magnetic flux blocking section is located to partially overlap a position rotated from the bisector in the direction opposite to the rotation direction by an angle 15.6°, and
wherein the third magnetic flux blocking section is located to partially overlap a position rotated from the bisector in the direction opposite to the rotation direction by an angle 20°.

10. The rotating electric machine according to claim 3,
wherein the distance between each circumferential core portion and the associated second magnetic flux blocking region is referred to as t, and the diameter of the circumferential core portion is referred to as 2R, and
wherein the distance t and the diameter 2R satisfy the following expression (6), $$0.006 \leq t/2R \leq 0.019 \quad (6).$$

11. The rotating electric machine according to claim 3,
wherein the first and second angle core portions of the convex core portion have reflection symmetry with respect to the bisector, and
wherein the rotor further includes an auxiliary first magnetic flux blocking region, the first magnetic flux blocking region and the auxiliary first magnetic flux blocking region having reflection symmetry with respect to the bisector.

12. The rotating electric machine according to claim 3,
wherein the first and second angle core portions of the convex core portion have reflection symmetry with respect to the bisector, and
wherein the rotor further includes an auxiliary second magnetic flux blocking region, the second magnetic flux blocking region and the auxiliary second magnetic flux blocking region having reflection symmetry with respect to the bisector.

13. The rotating electric machine according to claim 1,
wherein the rotor includes a plurality of core plates laminated on one another, each core plate having a thickness, and
wherein the distance between the rotor core outer circumference and the magnetic flux blocking region is set greater than or equal to said thickness of one of the core plates.

14. The rotating electric machine according to claim 1,
wherein the three peripheral core straight lines defining each convex core portion include a first peripheral core straight line at the center, and a second peripheral core straight line and a third peripheral core straight line, which sandwich the first peripheral core straight line,
wherein a straight line, which extends from the first straight line to the virtual circumference in an extension of the second straight line, is referred to as a second extension line, and a straight line, which extends from the first straight line to the virtual circumference in an extension of the third straight line, is referred to as a third extension line,
wherein the second peripheral core straight line is longer than the second extension line, and
wherein the third peripheral core straight line is longer than the third extension line.

15. The rotating electric machine according to claim 1,
wherein the permanent magnets are located to alternately have different polarities in the circumferential direction.

16. Use of a rotating electric machine according to claim 1 as a car air conditioner.

17. An enclosed electric compressor, comprising:
the motor for car air conditioner according to claim 16;
a rotating shaft driven by the motor;
a compression chamber; and
a compression operation body, which compresses gas in the compression chamber based on rotation of the rotating shaft and discharges the compressed gas.

* * * * *